United States Patent
Yotsumoto et al.

(10) Patent No.: US 7,134,387 B2
(45) Date of Patent: Nov. 14, 2006

(54) REFRIGERATOR DISMANTLING METHOD, COMPRESSION EQUIPMENT, AND REFRIGERATOR DISMANTLING DEVICE

(75) Inventors: Mikio Yotsumoto, Ibaraki (JP); Yutaka Matsuda, Takarazuka (JP); Takayuki Gyoubu, Otokuni (JP); Katsuya Sawada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 898 days.

(21) Appl. No.: 10/088,338

(22) PCT Filed: Jul. 12, 2001

(86) PCT No.: PCT/JP01/06063

§ 371 (c)(1),
(2), (4) Date: Mar. 12, 2002

(87) PCT Pub. No.: WO02/06668

PCT Pub. Date: Jan. 24, 2002

(65) Prior Publication Data

US 2002/0153439 A1 Oct. 24, 2002

(30) Foreign Application Priority Data

Jul. 14, 2000 (JP) ........................................ 2000-214825

(51) Int. Cl.
*B30B 3/00* (2006.01)
*B30B 15/30* (2006.01)

(52) U.S. Cl. ...................... 100/155 R; 100/50; 100/90; 100/161; 100/164; 100/170; 100/173; 100/176

(58) Field of Classification Search ............ 100/155 R, 100/161, 164, 170, 173, 176, 50, 90
See application file for complete search history.

(56) References Cited

U.S. PATENT DOCUMENTS

| | | | | | |
|---|---|---|---|---|---|
| 2,159,439 A | * | 5/1939 | Leighton | ..................... | 100/154 |
| 3,504,621 A | * | 4/1970 | Qualheim | ..................... | 100/96 |
| 3,645,199 A | * | 2/1972 | Kanna | ..................... | 100/70 R |
| 3,931,793 A | * | 1/1976 | Kolibas | ..................... | 100/176 |
| 4,723,507 A | * | 2/1988 | Ovshinsky et al. | ......... | 118/718 |
| 5,678,773 A | | 10/1997 | Takamura et al. | | |
| 5,826,631 A | * | 10/1998 | Gold et al. | ..................... | 141/1 |
| 6,131,509 A | * | 10/2000 | Davis | ......................... | 100/39 |

FOREIGN PATENT DOCUMENTS

| | | |
|---|---|---|
| JP | 52-136457 | 11/1977 |
| JP | 6-184348 | 7/1994 |
| JP | 8-45904 | 2/1996 |
| JP | 8-85114 | 4/1996 |
| JP | 11-314084 | 11/1999 |
| JP | 2000-102923 | 4/2000 |

\* cited by examiner

*Primary Examiner*—Lowell A. Larson
(74) *Attorney, Agent, or Firm*—Merchant & Gould, P.C.

(57) ABSTRACT

A refrigerant gas is collected and a compressor is removed from a discarded refrigerator, a heat-insulating housing including a heat insulator is cut/processed and separated into a plurality of pieces, and the pieces are compressed/processed by compression rollers opposing each other so as to collect a gas contained in the heat insulator. In accordance with this method, substantially no gas contained in the heat insulator is diffused at the time of cutting the heat-insulating housing, and the gas can be collected at a high concentration because it is collected by being allowed to leak out at the time of compressing. Furthermore, by using the compression rollers, closed-cells in the heat insulator can be crushed easily, thereby collecting the gas completely and reliably. Thus, it is possible to collect a foaming gas contained in the heat insulator efficiently and disassemble a refrigerator at low cost without increasing the size of equipment and an installation space.

4 Claims, 24 Drawing Sheets

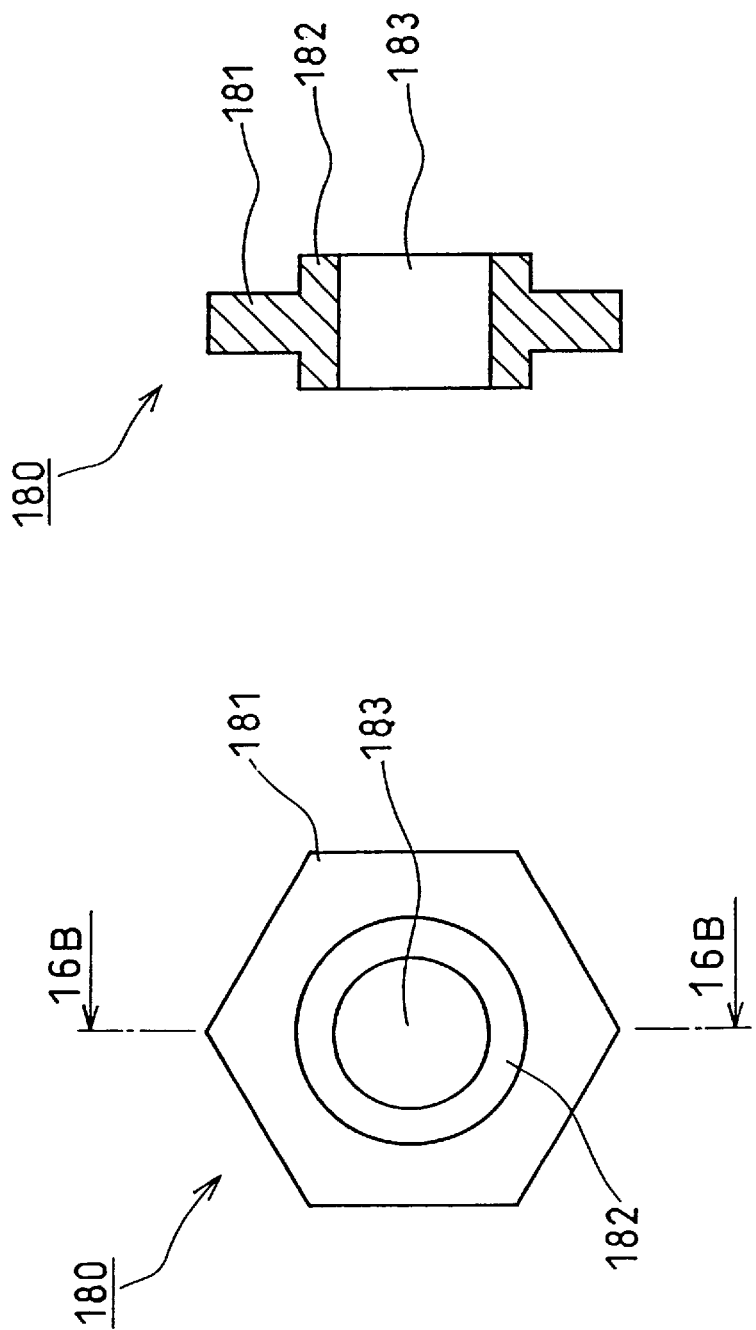

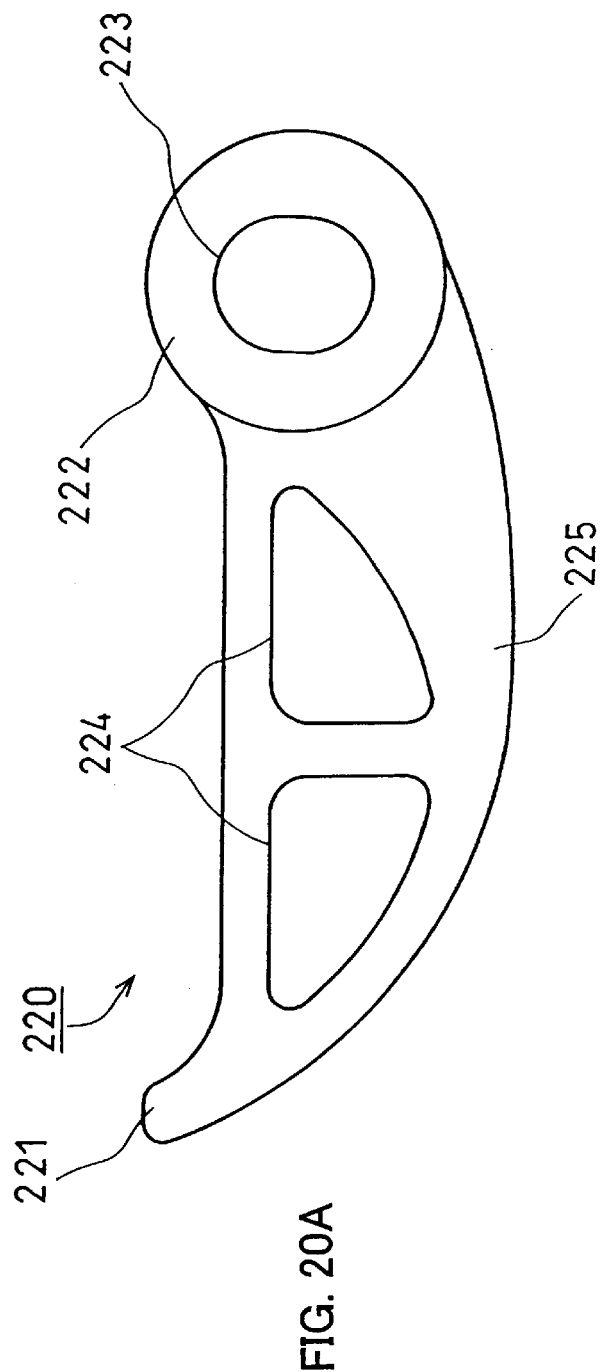 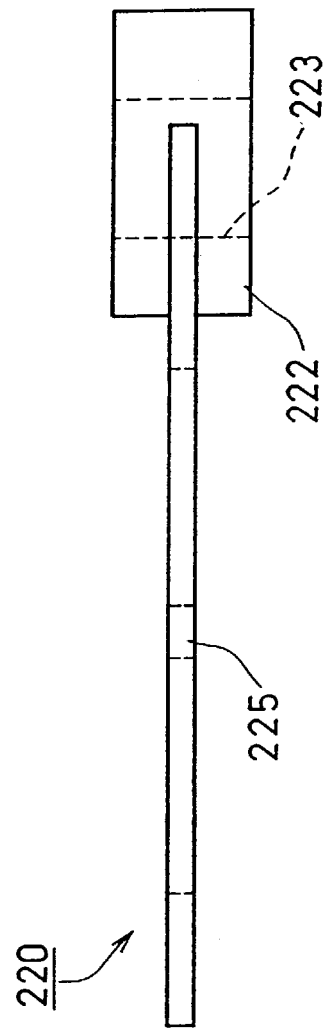
FIG. 20A
FIG. 20B

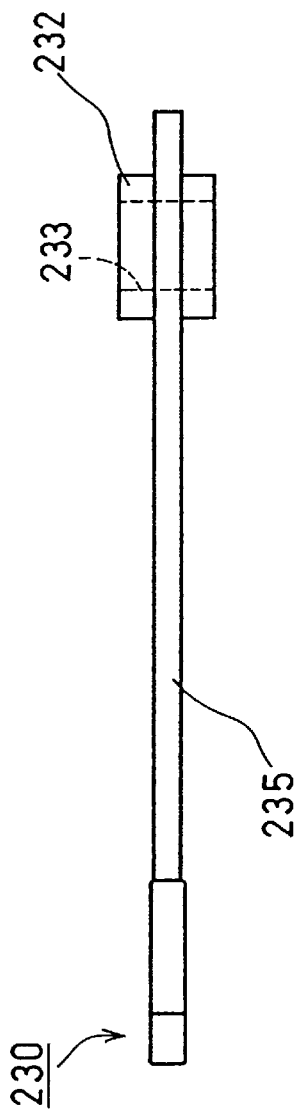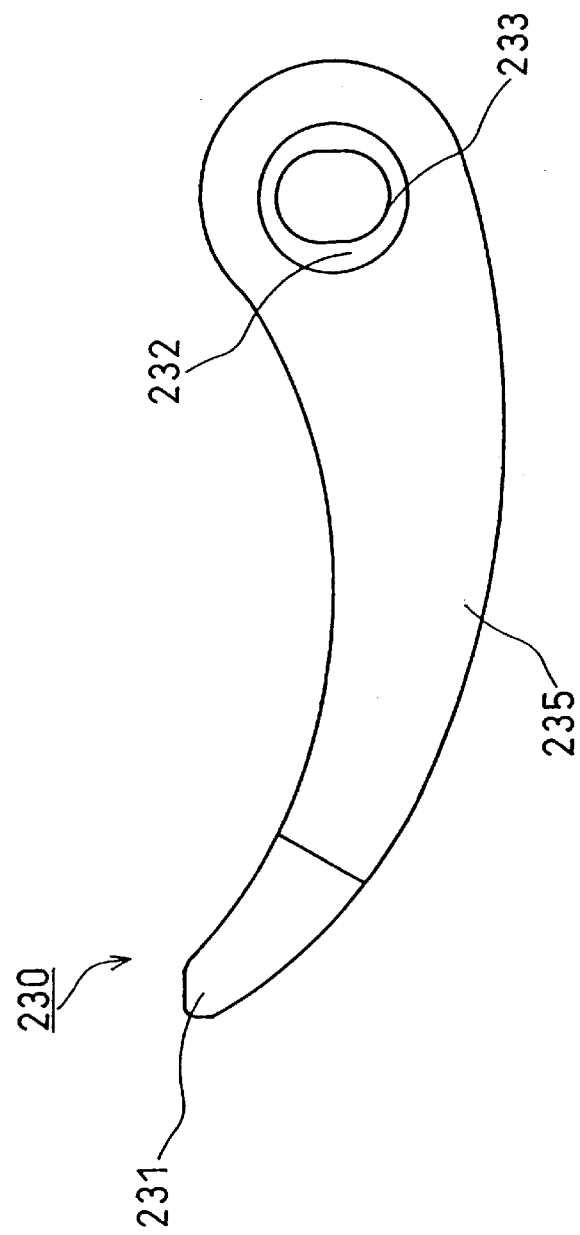
FIG. 21B
FIG. 21A

REFRIGERATOR DISMANTLING METHOD, COMPRESSION EQUIPMENT, AND REFRIGERATOR DISMANTLING DEVICE

TECHNICAL FIELD

The present invention relates to a method and a device for disassembling a discarded refrigerator. Also, the present invention relates to a compressing device that can be used suitably for disassembling a refrigerator.

BACKGROUND ART

Generally, a heat-insulating housing of a refrigerator is formed of a layered body including a steel (including iron and cast iron) plate as an outer wall material, a resin plate as an inner wall material and a heat insulator interposed between the steel plate and the resin plate. The heat insulator is made of urethane foam or the like, and chlorofluorocarbons are used as a foaming agent therefor. Since chlorofluorocarbons may destroy an ozone layer, it is necessary to collect them at the time of disposing of a refrigerator and prevent them from diffusing into the air. It also is desired that the steel plate and the resin plate should be collected for recycling.

As a conventional method for disassembling a discarded refrigerator, a method described in JP 2679562 B is known, for example. The following is a brief description of this method.

After a steel plate and a resin plate are removed from a heat-insulating housing, urethane foam first is cut into pieces of approximately 5 cm square, which are put into a hopper and sent to a crusher. In the process where external mechanical force is applied in the crusher so as to crush the urethane foam, closed-cells therein are destroyed. Chlorofluorocarbons released from the closed-cells and the crushed urethane grains are sent to a bag filter together with the air, so that a gaseous component and the urethane grains are separated. The gaseous component is cooled down in a condenser, so that the chlorofluorocarbons are liquefied and separated, and then the gas that is not condensed is sent back to the hopper. In this manner, the chlorofluorocarbons contained in the urethane foam can be separated and collected without being diffused into the air.

However, in the above-described disassembling method, after crushing the urethane foam, in order to separate the urethane grains and the released chlorofluorocarbons, a mixture thereof is sent with the air to the bag filter, so that they are separated by utilizing a wind power. Thus, since the chlorofluorocarbons are diffused in the carrier air, the concentration of the chlorofluorocarbons becomes extremely low. Under such conditions, the condensation and separation of the chlorofluorocarbons is by no means efficient. Furthermore, the equipment for carrying out these processes is large, raising equipment costs considerably.

Moreover, both the crusher for crushing the urethane foam and the separator for separating the urethane grains and the gaseous component generally are very large, which require a large installation space and cost much.

DISCLOSURE OF INVENTION

It is an object of the present invention to solve the conventional problems described above and to provide a disassembling method and a disassembling device that can collect a foaming gas efficiently and disassemble a refrigerator at low cost without increasing the size of equipment and an installation space. It also is an object of the present invention to provide a compressing device that can be used suitably for the above method for disassembling a refrigerator.

In order to achieve the above-mentioned objects, the present invention has the following configurations.

A method for disassembling a refrigerator of the present invention includes the processes of collecting a refrigerant gas and removing a compressor, cutting/processing and separating a heat-insulating housing including a heat insulator into a plurality of pieces, and compressing/processing the pieces by compression rollers opposing each other so as to collect a gas contained in the heat insulator.

With the above configuration, first, a refrigerant gas (for example, chlorofluorocarbons) is collected and a compressor is removed. Therefore, the refrigerant gas can be collected reliably, and it is possible to prevent the refrigerant gas from diffusing into the air in the later process. Next, since the heat-insulating housing is cut and separated into a predetermined shape and size, the gas contained in the heat insulator seldom is diffused in this process, and it is easy to handle each of the cut pieces thereafter. Also, since the heat-insulating housing may be cut without removing a steel plate and a resin plate that sandwich the heat insulator, the process can be simplified. Finally, the pieces that have been cut and separated are compressed and the gas in the heat insulator is made to leak out and collected, so that it is easy to collect the gas at a high concentration. In addition, since the pieces are compressed by the compression rollers, closed-cells in the heat insulator can be crushed easily, thereby collecting the gas contained therein completely and reliably. Furthermore, a foaming gas does not remain in the compressed pieces, which thus can be recycled directly. Moreover, the device for carrying out the above method can be miniaturized with an extremely simple configuration and does not require a large installation space. Therefore, the disassembling of a refrigerator and a recycling system thereof can be provided at a low cost.

In the above disassembling method, it is preferable that the heat-insulating housing is cut/processed to be at least one of substantially flat, substantially U-shaped and substantially L-shaped pieces. As described above, in the disassembling method of the present invention, it is sufficient to cut and separate the heat-insulating housing into the size and shape allowing the later compressing/processing. Even the heat-insulating housing having other members layered thereon may be cut without separating these members.

For example, the process of cutting/processing and separating the heat-insulating housing may include a process of cutting/processing the heat-insulating housing so as to remove a door and a process of slicing the heat-insulating housing into cross sections, each of predetermined thickness. Alternatively, the process of cutting/processing and separating the heat-insulating housing may include a process of cutting/processing the heat-insulating housing so as to remove a door and a process of cutting/processing and separating the heat-insulating housing into a plurality of substantially flat pieces and at least one substantially L-shaped piece. Alternatively, the process of cutting/processing and separating the heat-insulating housing may include a process of cutting/processing and separating the heat-insulating housing into pieces of a door, a top plate, a bottom plate, a side plate, a back plate and a partition plate.

The cutting and separating process in the above disassembling method also can be performed in the following method.

In a first cutting and separating method, by using a cutting device including a rotor with a principal plane, a spindle provided in a normal direction to the principal plane, and at least one impacting body mounted on the spindle rotatably, wherein the impacting body is mounted so that a predetermined fitting gap is provided between the impacting body and the spindle and a part of a periphery of the impacting body can be positioned beyond a periphery of the rotor, the heat-insulating housing is cut/processed by rotating the rotor at a high speed to allow the impacting body to impact on the heat-insulating housing at least at a critical impact velocity. The "critical impact velocity" refers to an intrinsic physical property value to a material of a heat-insulating housing to be cut and processed and, when the heat-insulating housing is a composite material of a plurality of materials with different critical impact velocities, means the largest critical impact velocity among them. In accordance with this first cutting and separating method, even when the heat-insulating housing has a structure in which different materials are intermixed or each heat-insulating housing has a different structure, the heat-insulating housing can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability.

In the above first cutting and separating method, it is preferable that the impacting body is allowed to impact on the heat-insulating housing at a speed of at least about 139 m/second (about 500 km/hour), and it is more preferable that the impacting body is allowed to impact at a speed of at least about 340 m/second (about 1224 km/hour). It also is preferable that the impacting body is allowed to impact on the heat-insulating housing at a frequency of at least about 150 times/min. This allows a high-speed cutting regardless of a material and a kind of the heat-insulating housing.

Also, in the above first cutting and separating method, it is preferable that the impacting body is allowed to impact on the heat-insulating housing at a speed at least twice as high as the critical impact velocity of the heat-insulating housing. This allows a high-speed cutting regardless of a material and a kind of the heat-insulating housing.

Furthermore, in the above first cutting and separating method, it is preferable that the impacting body cuts the heat-insulating housing by impacting on the heat-insulating housing to smash a surface thereof. This allows a high-speed cutting regardless of a material and a kind of the heat-insulating housing.

In a second cutting and separating method for performing the cutting and separating process in the disassembling method of the present invention, by using a cutting device including at least a first rotating unit and a second rotating unit, each of these rotating units including a rotor with a principal plane, a spindle provided in a normal direction to the principal plane, and at least one impacting body mounted on the spindle rotatably, wherein the impacting body is mounted so that a predetermined fitting gap is provided between the impacting body and the spindle and a part of a periphery of the impacting body can be positioned beyond a periphery of the rotor, the impacting body of the first rotating unit and the impacting body of the second rotating unit are allowed to impact on the heat-insulating housing sequentially while rotating the rotating units in a plane parallel with the principal plane of the rotor at a high speed and holding the first and second rotating units so that a circular path of a tip of the impacting body of the first rotating unit and a circular path of a tip of the impacting body of the second rotating unit during the rotation substantially are on the same plane, a cutting depth by the impacting body of the second rotating unit is made larger than that by the impacting body of the first rotating unit, and the impacting body of at least one of the rotating units is allowed to impact on the heat-insulating housing at least at a critical impact velocity, whereby the heat-insulating housing is cut/processed in a direction substantially parallel with the principal plane of the rotor. The "critical impact velocity" refers to an intrinsic physical property value to a material of a heat-insulating housing to be cut and processed and, when the heat-insulating housing is a composite material of a plurality of materials with different critical impact velocities, means the largest critical impact velocity among them. In accordance with this second cutting and separating method, while rotating at least two rotating units, the impacting bodies thereof are allowed to impact on the heat-insulating housing by sequentially increasing the cutting depths by the impacting bodies. At this time, the impacting body of at least one of the rotating units is allowed to impact at least at the critical impact velocity of the heat-insulating housing. Accordingly, even when the heat-insulating housing has a structure in which different materials are intermixed or each heat-insulating housing has a different structure, the heat-insulating housing can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability. Moreover, by allowing the impacting body to impact on the heat-insulating housing such that the cutting depths of a plurality of the rotating units increase sequentially, a stable and excellent cutting performance can be achieved even when the heat-insulating housing is thick or a plurality of members with different physical properties are layered in a thickness direction.

In the above second cutting and separating method, the impacting body of the first rotating unit, which impacts on the heat-insulating housing first, can be allowed to impact on the heat-insulating housing at least at the critical impact velocity. When a top layer of the heat-insulating housing is formed of a hard material (a difficult-to-machine material) such as metal and a relatively soft material such as resin is layered on its back side, for example, only the difficult-to-machine material layer as the top layer is cut by the first rotating unit, and the soft layer below is then cut by the second rotating unit. At this time, by allowing the impacting body of the first rotating unit to impact at least at the critical impact velocity of the difficult-to-machine material layer as the top layer, the difficult-to-machine material layer can be cut by a processing principle that will be described later. In this manner, in the case where the heat-insulating housing is formed by layering different kinds of materials, the rotational speed of each rotating unit is set according to physical properties (the critical impact velocity) of each layer, thereby allowing the impacting body to impact on each of these layers, so that an efficient and stable cutting can be achieved. In the above example, it is preferable that the impacting body of the second rotating unit, which cuts the soft layer below, also is allowed to impact at least at the critical impact velocity of this soft layer, but there are some cases where, depending on the material of the soft layer, the soft layer can be cut excellently even when allowing the impacting body to impact at the critical impact velocity or lower.

Also, in the above second cutting and separating method, the rotating units can be provided on a common base. This makes it possible to configure a compact cutting device. Also, it becomes easier to control the position of each rotating unit.

Furthermore, in the above second cutting and separating method, the impacting body can have a different shape in each of the rotating units. For example, an optimal shape of the impacting body is selected according to a rotational speed of the rotating unit, a radius of gyration of the impacting body or a cutting depth thereof, thereby balancing a cutting performance, cost and an installation safety in an excellent manner.

Moreover, in the above second cutting and separating method, it is preferable that the impacting body of at least one of the rotating units is allowed to impact on the heat-insulating housing at a speed of at least about 139 m/second (about 500 km/hour), and it is particularly preferable that the impacting body of at least one of the rotating units is allowed to impact at a speed of at least about 340 m/second (about 1224 km/hour). It also is preferable that the impacting body is allowed to impact on the heat-insulating housing at a frequency of at least about 150 times/min. This allows a high-speed cutting regardless of a material and a kind of the heat-insulating housing.

In the above second cutting and separating method, it is preferable that the impacting body of at least one of the rotating units is allowed to impact on the heat-insulating housing at a speed at least twice as high as the critical impact velocity of the heat-insulating housing. This allows a high-speed cutting regardless of a material and a kind of the heat-insulating housing.

Also, in the above second cutting and separating method, it is preferable that the impacting body that impacts on the heat-insulating housing at least at the critical impact velocity cuts the heat-insulating housing by impacting on the heat-insulating housing to smash a surface thereof. This allows a high-speed cutting regardless of a material and a kind of the heat-insulating housing.

Furthermore, in the above second cutting and separating method, it is preferable that, when the heat-insulating housing is formed by layering at least a first layer and a second layer that have different critical impact velocities, the first layer is cut mainly by the impacting body of the first rotating unit, the second layer is cut mainly by the impacting body of the second rotating unit, and an impact velocity of the impacting body of the first rotating unit against the heat-insulating housing is made different from that of the impacting body of the second rotating unit against the heat-insulating housing. In other words, when the heat-insulating housing is formed by layering a plurality of layers with different critical impact velocities, the cutting depths of the impacting bodies of the rotating units are adjusted, thus cutting different layers with different rotating units. This makes it possible to set optimally the impact velocities of the impacting bodies of the rotating units according to the respective critical impact velocity of the layer they cut. As a result, an efficient cutting becomes possible. In addition, an unnecessary high-speed rotation of the rotating unit can be avoided, and an excessive installation design and a wasteful energy consumption can be suppressed.

Moreover, in the above second cutting and separating method, it is preferable that, when the heat-insulating housing is formed by layering at least a first layer and a second layer that has a critical impact velocity smaller than the first layer, the first layer is cut mainly by the impacting body of the first rotating unit, and the second layer is cut mainly by the impacting body of the second rotating unit. In other words, when the heat-insulating housing is formed by layering layers with different critical impact velocities, the first layer with a larger critical impact velocity is cut first using the first rotating unit, and then the second layer with a smaller critical impact velocity is cut using the second rotating unit. In general, it is preferable to increase the impact velocity of the impacting body as a material to be cut has a larger critical impact velocity. However, in order to increase the impact velocity of the impacting body, the rotating unit has to be rotated at a high speed, which generates a larger centrifugal force. This brings about the need for a weight reduction for suppressing the generation of centrifugal force or the need for a reinforcement of the impacting body. On the other hand, a smaller cutting depth allows a miniaturization of the impacting body, making it possible to reduce weight, which can suppress the generation of the centrifugal force. Thus, by cutting the first layer with a larger critical impact velocity first, it becomes possible both to secure the necessary impact velocity of the impacting body and to reduce the centrifugal force that is generated.

In this case, it is preferable that the cutting depth by the impacting body of the first rotating unit is equal to or larger than a thickness of the first layer. This allows the first layer with a larger critical impact velocity to be cut by the first rotating unit. Therefore, it becomes unnecessary to cut the first layer with the second rotating unit, so that a load on the second rotating unit can be reduced. For example, the impact velocity of the impacting body of the second rotating unit can be set lower than that of the first rotating unit.

It is preferable that the impacting body of the first rotating unit is allowed to impact on the first layer at least at the critical impact velocity of the first layer, in particular, at a speed at least twice as high as the critical impact velocity of the first layer. In this manner, the first layer that is difficult to cut can be cut stably based on a processing principle described later. Also, a stable high-speed cutting becomes possible along with an increase in the impact velocity of the impacting body. More specifically, although it depends on a material for the first layer, the impacting body of the first rotating unit desirably desirably is allowed to impact on the first layer at a speed of at least about 139 m/second (about 500 km/hour), in particular, at a speed of at least about 340 m/second (about 1224 km/hour). Accordingly, the first layer can be cut at a high speed regardless of the material and kind of the heat-insulating housing.

On the other hand, the impacting body of the second rotating unit can be allowed to impact on the second layer at a speed not greater than the critical impact velocity of the first layer. In other words, by cutting the first layer almost entirely by the first rotating unit, the impact velocity of the impacting body of the second rotating unit can be set lower than that of the first rotating unit. This can reduce the rotational speed of the second rotating unit, thus relaxing the design strength of each part of the rotating unit (for example, a spindle, a peripheral region of a through hole of the impacting body through which the spindle is passed or the like). This also eliminates the need for a large driving device for a high-speed rotation. Thus, it becomes possible to reduce cost and improve reliability and safety. In the case described above, it is preferable that the impacting body of the second rotating unit is allowed to impact at least at the critical impact velocity of the second layer. In this manner, the second layer can be cut stably based on the processing principle of the present invention described above.

Nevertheless, there are some cases where, depending on the material of the second layer, the second layer can be cut even when allowing the impacting body of the second rotating unit to impact at the critical impact velocity of the second layer or lower. In such cases, it is preferable in view of lifetime of the impacting body, cost, reliability, safety and energy consumption that it is allowed to impact at as low a speed as possible.

In the above method, it is preferable that the circular path of the tip of the impacting body of the first rotating unit has a smaller radius than the circular path of the tip of the impacting body of the second rotating unit. By reducing the size of the circular path of the first rotating unit, it becomes easier to rotate the first rotating unit at a high speed. Therefore, the impacting body of the first rotating unit can be allowed to impact on the first layer with a larger critical impact velocity at a higher speed.

In the above first and second cutting and separating methods, an outer shape of the impacting body can be any one of a polygon with a plurality of corners, a shape with projections at substantially equal angles on its periphery, a disc shape, a substantially-bell shape, a substantially-"9" shape and a substantially-bow shape. The shape of the impacting body is selected according to the impact velocity of the impacting body, a cutting depth and a material of the heat-insulating housing serving as an object to be cut, thereby achieving an efficient cutting device.

Also, in the above first and second cutting and separating methods, it is preferable that the fitting gap between the spindle and the impacting body is at least 2 mm, in particular, about 5 to 10 mm. When the fitting gap is smaller than the above range, the displacement of the impacting body caused by the rebound after the impacting body has impacted on the heat-insulating housing cannot be absorbed excellently, lowering a cutting performance. On the other hand, when the fitting gap is too large, the effect of improving the cutting performance cannot be obtained, or rather the cutting performance deteriorates because the position of the impacting body is unstable or the adjacent impacting bodies collide with each other.

Next, a compressing device of the present invention includes at least a pair of compression rollers opposing each other for compressing/processing an object to be compressed, a gas diffusion preventing device for preventing a diffusion of a gas leaking from the object to be compressed during compressing, and a gas collecting device for collecting the gas. With the above configuration, since the object is compressed by the compression rollers, closed-cells in the object to be compressed can be crushed easily and reliably, thereby collecting the gas contained therein completely and reliably. Furthermore, a gas is made to leak out by the compression, and the gas diffusion preventing device for preventing a diffusion of the gas further is provided, making it easier to collect the gas at a high concentration. The gas does not remain in the compressed object after compression, which thus can be recycled directly. Moreover, such a compressing device can be miniaturized with an extremely simple configuration and does not require a large installation space. Therefore, a gas collecting system can be provided at a low cost.

Preferably, the above compressing device further includes a carrier device for carrying the object to be compressed. With this preferable configuration, the compressing process can be automated.

In the above preferable configuration, it is preferable that the carrier device is a belt conveyor. With this preferable configuration, the configuration of the carrier device can be simplified, thereby achieving a cost reduction.

Also, in the above compressing device, it is preferable that the object to be compressed is a piece obtained by cutting a heat-insulating housing of a refrigerator. With this preferable configuration, the disassembling of a refrigerator and the recycling system thereof can be achieved with a small space and a low cost.

Next, a first device for disassembling a refrigerator of the present invention includes a cutting device for cutting/processing a heat-insulating housing of a refrigerator including a heat insulator into a plurality of pieces, and a compressing device for compressing/processing the pieces with compression rollers opposing each other so as to collect a gas contained in the heat insulator. The cutting device includes a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor, and the rotor is rotated at a high speed to allow the impacting body to impact on the heat-insulating housing at least at a critical impact velocity.

A second device for disassembling a refrigerator of the present invention includes a cutting device for cutting/processing a heat-insulating housing of a refrigerator including a heat insulator into a plurality of pieces, and a compressing device for compressing/processing the pieces with compression rollers opposing each other so as to collect a gas contained in the heat insulator. The cutting device includes at least a first rotating unit and a second rotating unit. Each of these rotating units includes a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor, the impacting body of the first rotating unit and the impacting body of the second rotating unit impact on the heat-insulating housing sequentially while the rotating units are rotated in a plane parallel with the principal plane of the rotor at a high speed and the first and second rotating units are held so that a circular path of a tip of the impacting body of the first rotating unit and a circular path of a tip of the impacting body of the second rotating unit during the rotation substantially are on the same plane, a cutting depth by the impacting body of the second rotating unit is larger than that by the impacting body of the first rotating unit, and the impacting body of at least one of the rotating units impacts on the heat-insulating housing at least at a critical impact velocity, whereby the heat-insulating housing is cut in a direction substantially parallel with the principal plane of the rotor.

In the above first and second devices for disassembling a refrigerator, the "critical impact velocity" refers to an intrinsic physical property value to a material of a heat-insulating housing to be cut and processed and, when the heat-insulating housing is a composite material of a plurality of materials with different critical impact velocities, means the largest critical impact velocity among them.

By using the cutting device of the above first and second devices for disassembling a refrigerator, even when the heat-insulating housing has a structure in which different materials are intermixed or each heat-insulating housing has a different structure, the heat-insulating housing can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability. Moreover, since only the part subjected to the impact by the impacting body and its vicinity are broken and cut, the gas contained in the heat insulator seldom diffuses during cutting. Also, it is easy to handle each of the cut pieces thereafter.

Furthermore, in accordance with the cutting device of the second device for disassembling a refrigerator, while rotating at least two rotating units, the impacting bodies thereof are allowed to impact on the heat-insulating housing by sequentially increasing the cutting depths of the impacting bodies. At this time, the impacting body of at least one of the rotating units is allowed to impact at least at the critical impact velocity of the heat-insulating housing. Accordingly, by allowing the impacting body to impact on the heat-insulating housing such that the cutting depths of a plurality of the rotating units increase sequentially, a stable and excellent cutting performance can be achieved even when the heat-insulating housing is thick or a plurality of members with different physical properties are layered in a thickness direction.

According to the compressing device in the first and second devices for disassembling a refrigerator, the pieces that have been cut and separated are compressed and the gas in the heat insulator is made to leak out and collected, so that it is easy to collect the gas at a high concentration. In addition, since the pieces are compressed by the compression rollers, closed-cells in the heat insulator can be crushed easily, thereby collecting the gas contained therein completely and reliably. Furthermore, a foaming gas does not remain in the compressed pieces, which thus can be recycled directly.

Moreover, the cutting device and the compressing device described above both can be miniaturized with an extremely simple configuration and do not require a large installation space. Therefore, the disassembling of a refrigerator and a recycling system thereof can be realized at a low cost.

In the above first and second devices for disassembling a refrigerator, it is preferable that the compressing device further includes a gas diffusion preventing device for preventing a diffusion of a gas leaking from the pieces during compressing/processing and a gas collecting device for collecting the gas. With this preferable configuration, it becomes still easier to collect the gas at a high concentration.

Also, in the above first and second devices for disassembling a refrigerator, it is preferable that the cutting device is mounted to an arm of a robot with a multi-axis control function. This allows a three-dimensional processing (processing of a curved surface).

In the above first and second devices for disassembling a refrigerator, it is preferable that at least one of an intrinsic oscillatory waveform and an intrinsic oscillation frequency that are caused by an impact of the impacting body against the heat-insulating housing, a load on a driving motor for rotating the rotor and an outer shape of the heat-insulating housing is detected, and at least one of a rotational speed of the rotor, a cutting depth and a relative speed (a feed speed) and a relative moving direction (a feed direction) between the rotor and the heat-insulating housing is changed. This makes it possible to set optimal cutting conditions automatically even when the material of the heat-insulating housing is unknown, allowing an automation of the cutting.

Furthermore, in the above second device for disassembling a refrigerator, it is preferable that at least one of an intrinsic oscillatory waveform and an intrinsic oscillation frequency that are caused by an impact of the impacting body against the heat-insulating housing and a load on a driving motor for rotating the rotor is detected for each of the rotating units, and at least one of a rotational speed of the rotor, a cutting depth and a relative speed (a feed speed) and a relative moving direction (a feed direction) between the rotor and the heat-insulating housing is changed for each of the rotating units. This makes it possible to set optimal cutting conditions automatically for each of the rotating units, allowing an efficient cutting.

Preferably, the above first and second devices for disassembling a refrigerator further include a carrier device for carrying each of the pieces that have been cut/processed and separated in the cutting device to the compressing device. In this way, the cut pieces can be carried automatically or semi-automatically, thus achieving an efficient disassembling device. This carrier device can be constituted by a belt conveyor and/or a robot arm for grasping and transferring the cut pieces onto the belt conveyor or the compressing device.

BRIEF DESCRIPTION OF DRAWINGS

FIG. 16A is a front view showing a regular-hexagonal impacting body, and FIG. 16B is a sectional view thereof taken along the line 16B—16B in FIG. 16A seen in an arrow direction.

FIG. 20A is a front view showing a substantially bow-shaped impacting body, and FIG. 20B is a side view thereof.

FIG. 21A is a front view showing a substantially bow-shaped impacting body, and FIG. 21B is a side view thereof.

BEST MODE FOR CARRYING OUT THE INVENTION

A method for disassembling a refrigerator of the present invention includes the processes of collecting a refrigerant gas and removing a compressor (a refrigerant gas collecting process), cutting/processing and separating a heat-insulating housing including a heat insulator into a plurality of pieces (a cutting and separating process) and compressing/processing the pieces by compression rollers opposing each other so as to collect a gas contained in the heat insulator (a compressing process).

In the following, these processes will be described sequentially.

A. Refrigerant Gas Collecting Process

First, a refrigerant gas (for example, chlorofluorocarbons) in a refrigerator to be disassembled is collected by a known method, and a compressor is removed. This can prevent the refrigerant gas from diffusing into the air in the subsequent cutting and separating process. Furthermore, a heat exchanger and an electric controller including circuit boards also may be removed at this time. These operations can be conducted manually.

B. Cutting and Separating Process

Next, after attachments such as the compressor are removed, the heat-insulating housing is cut/processed and separated into a plurality of pieces.

The following is a description of an example of cutting/processing a two-door refrigerator.

Figure 1:
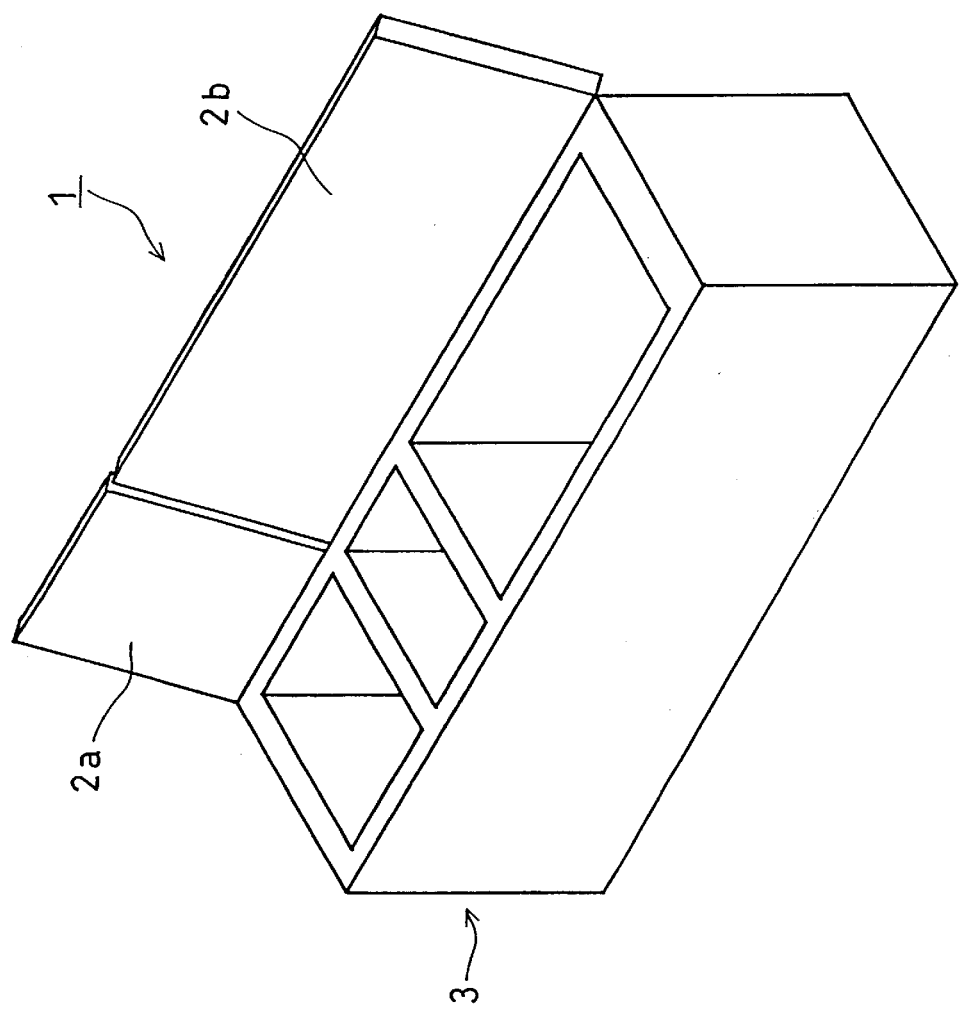
FIG. 1 is a schematic perspective view showing a heat-insulating housing of a two-door refrigerator.

FIG. 1 is a schematic perspective view showing a heat-insulating housing of the two-door refrigerator, which has been subjected to the above-described refrigerant gas collecting process. A heat-insulating housing 1 includes an upper door 2a, a lower door 2b and a housing main body 3.

Figure 2:
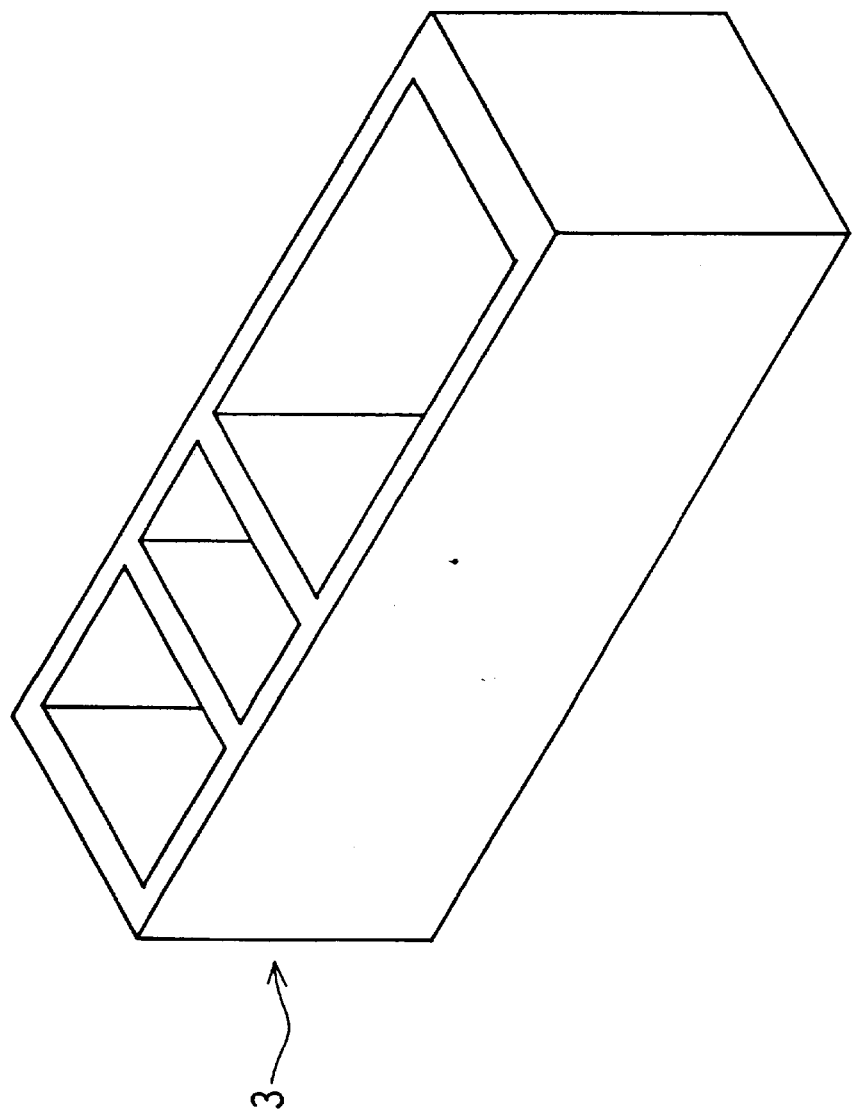
FIG. 2 is a schematic perspective view showing a housing main body obtained by removing doors from the heat-insulating housing of the two-door refrigerator.

First, as shown in FIG. 2, the upper door 2a and the lower door 2b are removed by cutting.

Then, the housing main body 3 is cut at various cutting positions and separated into pieces having a predetermined shape. There is no particular limitation on the cutting positions as long as pieces having a size and shape that can be compressed/processed in the subsequent compressing process can be obtained. In general, it is preferable to cut the housing main body until substantially flat, substantially U-shaped or substantially L-shaped pieces are obtained. It is more preferable to cut it until substantially flat or substantially L-shaped pieces are obtained, and it is particularly preferable to cut it until substantially flat pieces are obtained. It is not necessary to cut it into excessively small pieces. When the pieces are too small, not only does its cutting time take longer, but also gases contained in the heat insulator may leak out during cutting, and handling of the pieces becomes complicated thereafter.

Specific examples of cutting will be described using FIGS. 3 to 5.

Figure 3:
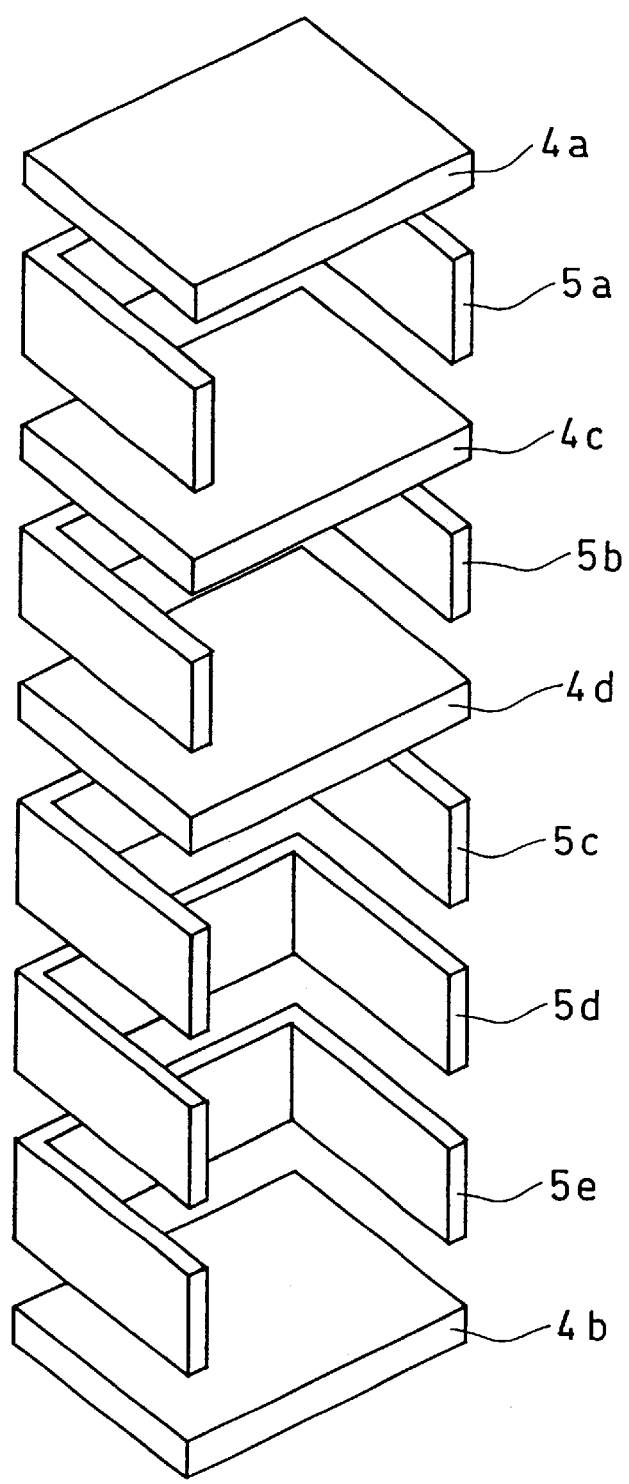
FIG. 3 is a perspective view showing an example of cutting the heat-insulating housing of the refrigerator.

FIG. 3 shows an example in which the housing main body 3 is sliced into cross sections. As shown in this figure, the housing main body 3 is cut by each predetermined thickness along a plane perpendicular to its longitudinal direction (the vertical direction in FIG. 3) and separated into substantially flat pieces of a top plate 4a, a bottom plate 4b, partition plates 4c and 4d and substantially "U"-shaped pieces 5a, 5b, 5c, 5d and 5e. If necessary, the substantially "U"-shaped pieces 5a, 5b, 5c, 5d and 5e further may be cut along a plane parallel with the longitudinal direction and separated into substantially "L"-shaped or substantially flat pieces.

Figure 4:
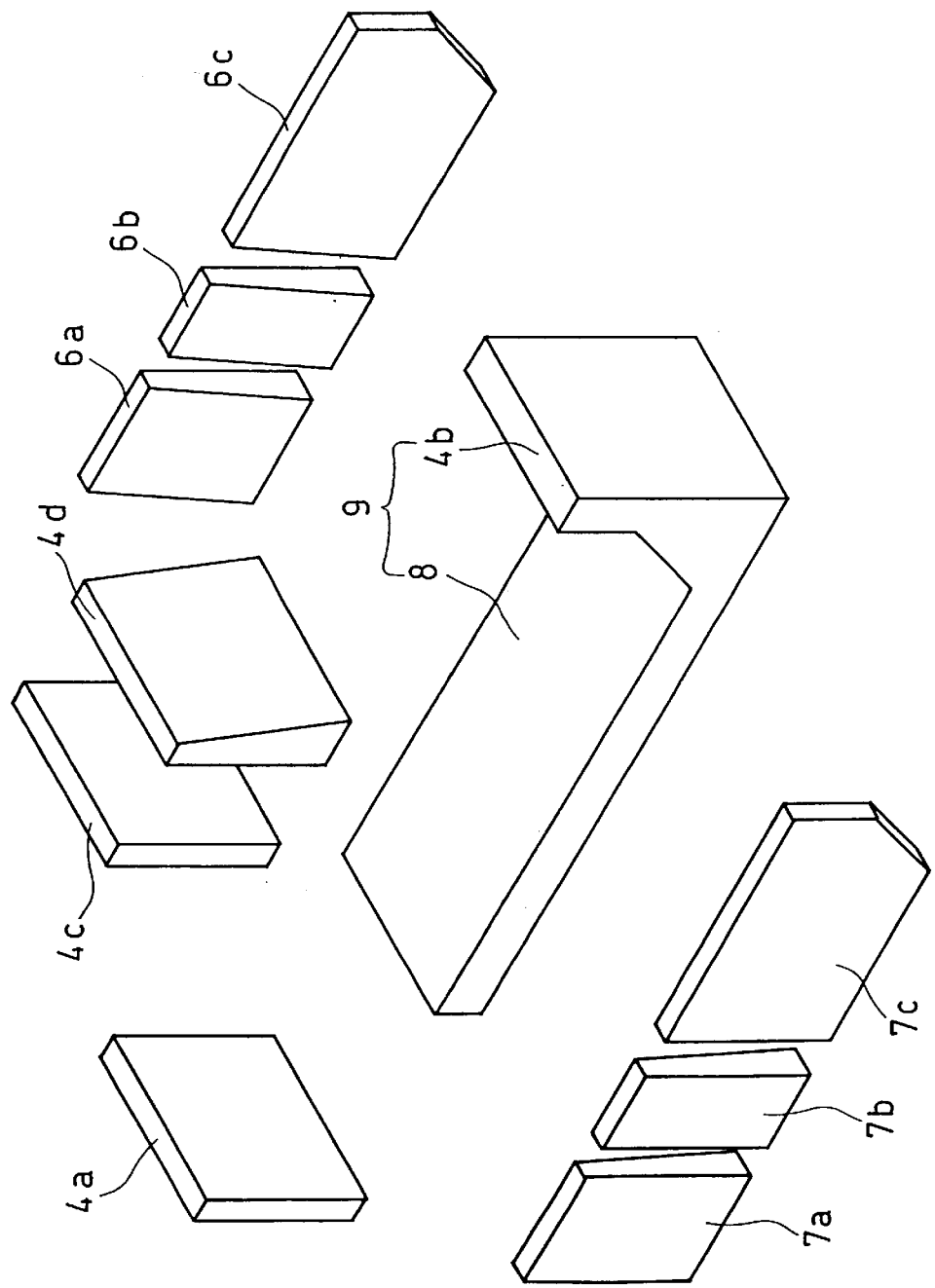
FIG. 4 is a perspective view showing another example of cutting the heat-insulating housing of the refrigerator.

FIG. 4 shows an example in which the housing main body 3 is cut/processed and separated into substantially flat pieces of the top plate 4a, the partition plates 4c and 4d, right side plates 6a, 6b and 6c and left side plates 7a, 7b and 7c and a piece 9 formed of the bottom plate 4b and a back plate 8 connected to have a substantially-"L" shape.

Figure 5:
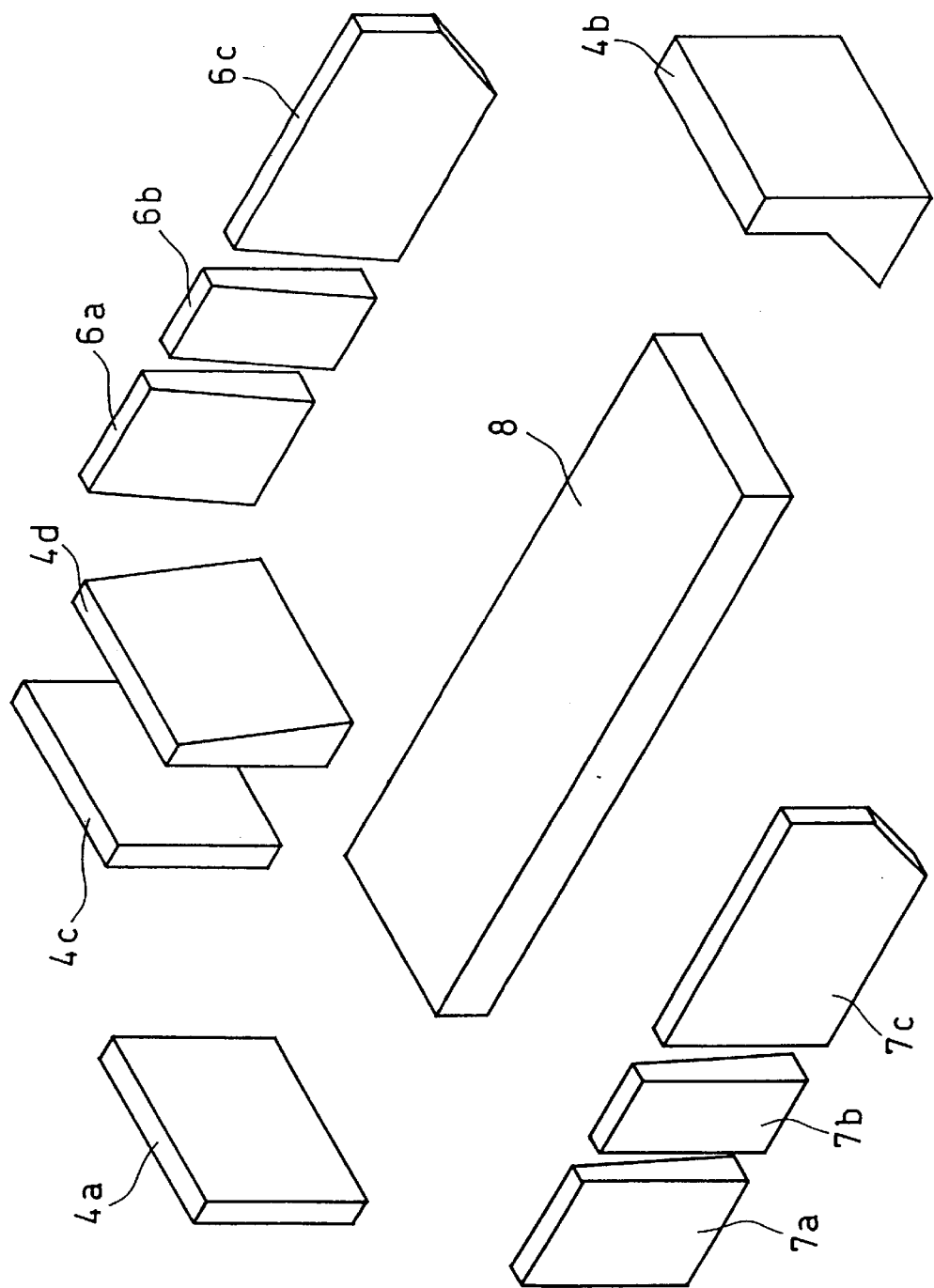
FIG. 5 is a perspective view showing still another example of cutting the heat-insulating housing of the refrigerator.

FIG. 5 shows an example in which the substantially "L"-shaped piece 9 shown in FIG. 4 is separated into the bottom plate 4b and the back plate 8 that are substantially flat.

The following is a description of a device and a method for cutting and separating the heat-insulating housing 1 into the plurality of pieces as above.

Conventionally, for example, sheet steel pieces (cold-rolled steel sheets or the like) are cut generally by a band-shaped cutter (a band saw machine) or a disc-shaped cutter (a metal slitting saw), which is provided with a high hardness saw blade, by grinder cutting using a grinding tool in which abrasive grains are formed in a disc shape or in a cylindrical shape, or by gas cutting using an acetylene gas or the like.

Also, resin-molded articles are cut generally by a band saw machine, a metal slitting saw, an end mill, or the like.

Furthermore, a cutting method of using a diamond wheel cutter that is rotated at a high speed sometimes is employed.

However, the conventional cutting methods described above respectively have the following problems.

When the sheet steel pieces are cut using a tool such as a band saw machine or a metal slitting saw, a cutting blade of the tool is pressed strongly against an object to be cut to cause a continuous shear fracture in the object to be cut, thus cutting/processing this object. Since the cutting blade is pressed strongly against the object to be cut, frictional heat is generated greatly at the cutting part. Therefore, the embrittlement and enfeeblement of its cutting edge due to the heat aggravate the abrasion of the cutting edge. Due to the abrasion of the cutting blade, the cutting speed is lowered considerably and thus is limited. In addition, since the cutting blade is allowed to bite into the object to be cut, a high stiffness is needed for holding the tool (a cutter) and the object to be cut, thus requiring a large-scale holding mechanism and a high equipment cost.

When a blade made of a material containing a ferroalloy as a main constituent is used in cutting a metallic magnetic component, the fragments and powder that are produced by cutting an object to be cut are magnetic substances and thus adhere to the edge of the blade. Consequently, the increase in frictional resistance or the damage of the edge lowers the cutting performance of the blade considerably.

The grinder cutting using a grindstone is carried out by causing continuous small shears by cutting surfaces of the abrasive grains. Since the corners (cutting blades) of the abrasive grains are not so sharp and the peripheral speed of the grinder is relatively high, the frictional heat generated at the cutting part is great. In order to secure the lifetime of the grindstone, it is necessary to control the temperature of the cutting part appropriately. Thus, the cutting speed is limited.

In the gas cutting using a gas such as acetylene, the cutting speed is slow, and it is important in view of safety that no combustibles be present in the vicinity of the cutting section. Therefore, this method is not suitable for cutting a heat-insulating housing of a refrigerator including a resin plate and a urethane heat insulator.

In the case of using a band saw machine, a metal slitting saw, or the like for cutting resin-molded articles, when the cutting speed is raised, the vicinity of the cutting part of an object to be cut starts burning or melts due to the frictional heat generated by the friction with the tool, thus causing a change in physical properties of the object.

In the cutting method using a diamond wheel cutter, when the cutting speed is raised, the wear rate of the diamond wheel cutter increases due to frictional heat and therefore the cutting speed is limited. In addition, the diamond wheel cutter is expensive, and the cutting amount and the wear rate of the diamond wheel have a close relationship, resulting in high cutting cost.

Moreover, a heat-insulating housing of a refrigerator generally is formed of a layered body including a steel plate, a heat insulator and a resin plate. Thus, it is extremely difficult to cut such an object formed of a plurality of members with different physical properties continuously using the same tool.

Furthermore, there are various types of discarded refrigerators, and the heat-insulating housings thereof also are formed of various kinds of materials. Although main components such as a compressor already are removed in advance, a component sometimes is attached at a position that cannot be seen from the outside. When the information required for cutting/processing an object (physical properties or the like) is unknown or when an object to be cut is formed of a plurality of members and the shapes and materials of the members hiding behind the surface member are unknown, it is difficult with the conventional cutting tools to find out optimal cutting conditions merely from the image information of the surface and outer shape of the object to be cut and to control the cutting automatically.

Furthermore, it is difficult to cut a heat-insulating housing formed of members containing different materials such as sheet steel and resin-molded articles continuously one after another by rotating one kind of a conventionally-known cutting tool (a tool provided with a cutting blade) or by moving it at a high speed.

Accordingly, as a method for cutting a heat-insulating housing of a refrigerator, the present invention provides a cutting method in which, instead of a conventional tool provided with a blade, an impacting body formed of a hard solid body such as metal is allowed to impact on the heat-insulating housing (an object to be cut, also referred to as "a workpiece" in the following) at a very high speed with a high frequency to generate a plastic wave by the impact energy, thus breaking and removing the part subjected to the impact instantaneously.

This cutting method is obtained by putting a theory into practical use as a cutting device and a cutting method; the theory is a plastic wave theory in which when a high-speed tensile force is applied at least at a critical impact velocity, a fracture occurs immediately at the part where the force has been applied, or a theory in which when a high-speed compressive force is applied at least at a critical impact velocity, the ductility is deteriorated rapidly and thus the part where the force has been applied is broken even by a small distortion (a phenomenon similar to the embrittlement).

In other words, the cutting device and the cutting method of the present invention are based on the following principle: when an impacting body that executes a high speed circular motion impacts on a workpiece at least at the critical impact velocity of the workpiece and then bounces (rebounds), the surface of the workpiece in a highly limited portion including the part subjected to the impact by the impacting body and its vicinity is smashed (broken) instantaneously into a minute granular state or minute fragments by a high speed compression that occurs together with impact, a high speed tension due to friction, high speed shearing, or the like.

Generally, in processing a workpiece, external forces such as a tensile force, a compressive force or a shearing force are applied to the workpiece by the movement of a tool and thus the workpiece is distorted or deformed. In this case, when the speed of the tool, i.e., the processing speed is increased gradually and reaches a certain limitation, the ductility of the workpiece deteriorates rapidly. This limitation speed is called the critical impact velocity. In the workpiece, the part subjected to the force applied by a tool is broken immediately when the processing speed is increased to the critical impact velocity or more. When utilizing this, by allowing an impacting body to impact on the workpiece at least at the critical impact velocity, only the very surface portion of the workpiece that is subjected to the impact by the impacting body can be broken and removed. By setting the extremely large number of impacts by the impacting body per unit time, this phenomenon can be created repeatedly. Furthermore, by successively changing the position at which the impacting body impacts, only the part on which the impacting body impacts can be removed and processed successively without breaking the portion other than the part in the workpiece. Macroscopically, this can be considered as cutting and processing of the workpiece. According to this cutting method, a relatively smooth cut surface can be obtained.

In order to generate a plastic wave, the impacting body has to impact on a workpiece at least at the critical impact velocity of the workpiece. More specifically, in general, the impact velocity preferably is set to be at least 139 m/second (about 500 km/hour), more preferably at least 340 m/second (about 1224 km/hour).

When converted to the peripheral speed of a disc with a diameter of 100 mm, the above-mentioned impact velocities correspond to rotational speeds of at least 26,500 rpm and of at least 65,130 rpm, respectively.

In practice, the critical impact velocity varies depending on the kind of a workpiece. For instance, the critical impact velocities of aluminum, soft steel, stainless steel and titanium are about 49.7 m/second, 30.0 m/second, 152.3 m/second, and 61.8 m/second, respectively. Therefore, the impact velocity of the impacting body can be changed according to the kind of workpiece. The impact velocity of the impacting body preferably is set to be at least twice, further preferably at least three times, and particularly preferably at least four times as high as the critical impact velocity of the workpiece, because this allows stable cutting.

The impacting body has a through hole and is maintained rotatably by a spindle provided perpendicularly on a rotor with a predetermined fitting gap being provided between the impacting body and the spindle. By providing the fitting gap, it is possible to absorb the displacement of the impacting body that occurs right after the impacting body has impacted on a workpiece. Preferably, the fitting gap between the spindle for supporting the impacting body and the through hole of the impacting body is set to be at least 2 mm, more preferably about 5 to 10 mm. It is preferable that the fitting gap is designed to be larger along with an increase in impact velocity of the impacting body. The fitting gap according to the present invention is far beyond the gap value according to the Japanese Industrial Standard (JIS), which generally defines the fitting state between an axis and a bearing, and is two to three orders of magnitude larger than the gap value.

As described above, the processing principle of the present invention is different from a conventional processing principle by utilizing impact. In the conventional processing principle, a cutting blade of a cutting tool is allowed to collide with a workpiece at a low speed (a maximum of about 10 m/second) and the workpiece is deformed in a sequence from elastic deformation through plastic deformation to breakage, thus breaking the surface of the workpiece in a relatively large area.

The impacting body of the present invention is not provided with a sharp cutting blade as in the conventional cutting tool.

The cutting-according to the present invention based on the above-mentioned principle is characterized as follows.

(1) According to the smashing (cutting) principle utilizing the high speed compression and high speed tension at least at a critical impact velocity when the impacting body impacts on a workpiece, an extremely small amount of the frictional heat only is generated at the part to be cut in the workpiece. In addition, the impacting body is air-cooled rapidly by its quick movement and thus the increase in temperature of the impacting body itself also is extremely small.

(2) A conventional cutting tool that executes a rotational motion, a reciprocating motion, or a rectilinear motion is heavily worn away. On the other hand, the impacting body of the present invention is subjected to work hardening by the impact on a workpiece and therefore is hardened as it is used, thus increasing its abrasion resistance.

(3) In the processing principle of the present invention, the cutting resistance and the frictional resistance are low. As a result, a workpiece does not have to be held and fixed firmly during cutting. In addition, it is not necessary to provide a high stiffness for a spindle for supporting the impacting body, a rotor that rotates at a high speed, a main shaft, a bearing and a robot for holding the main shaft of the rotor.

(4) By mounting an oscillation detector for detecting an intrinsic oscillatory waveform (or an intrinsic oscillation frequency), which is generated by a rotor depending on the nature of the workpiece when cutting the workpiece, on a multi-axis control robot, processing conditions (the impact velocity of the impacting body, the moving speed, etc.) can be controlled depending on the workpiece to be processed.

(5) Even when a workpiece is formed of a plurality of different members (for example, metal, a resin-molded article, glass or ferrite) and the inside of the workpiece cannot be seen from the outside, the workpiece can be cut continuously using the same cutting device.

As described above, the cutting device of the present invention has a simple configuration and can achieve an extended lifetime and a considerably improved reliability. In addition, since it is not necessary to take into consideration during the cutting process that different materials may be intermixed in a workpiece, the cutting device of the present invention is extremely useful as a smashing or cutting device that is a part of recycling equipment.

Using the cutting device described above makes it possible to automate disassembling and cutting processes of a refrigerator for the purpose of disposal, and eliminates the need for changing the type of cutting tool, processing conditions or a cutting device according to the kind of a heat-insulating housing and components. In addition, the present invention contributes to the improvement in reliability, the extension of lifetime of the cutting device, the increase in recycling ratio, the environmental protection, and the efficient use of natural resources.

In the following, an example of a specific configuration of the above-described cutting device will be described, with reference to the accompanying drawings.

(Embodiment B-1)

Figure 6:
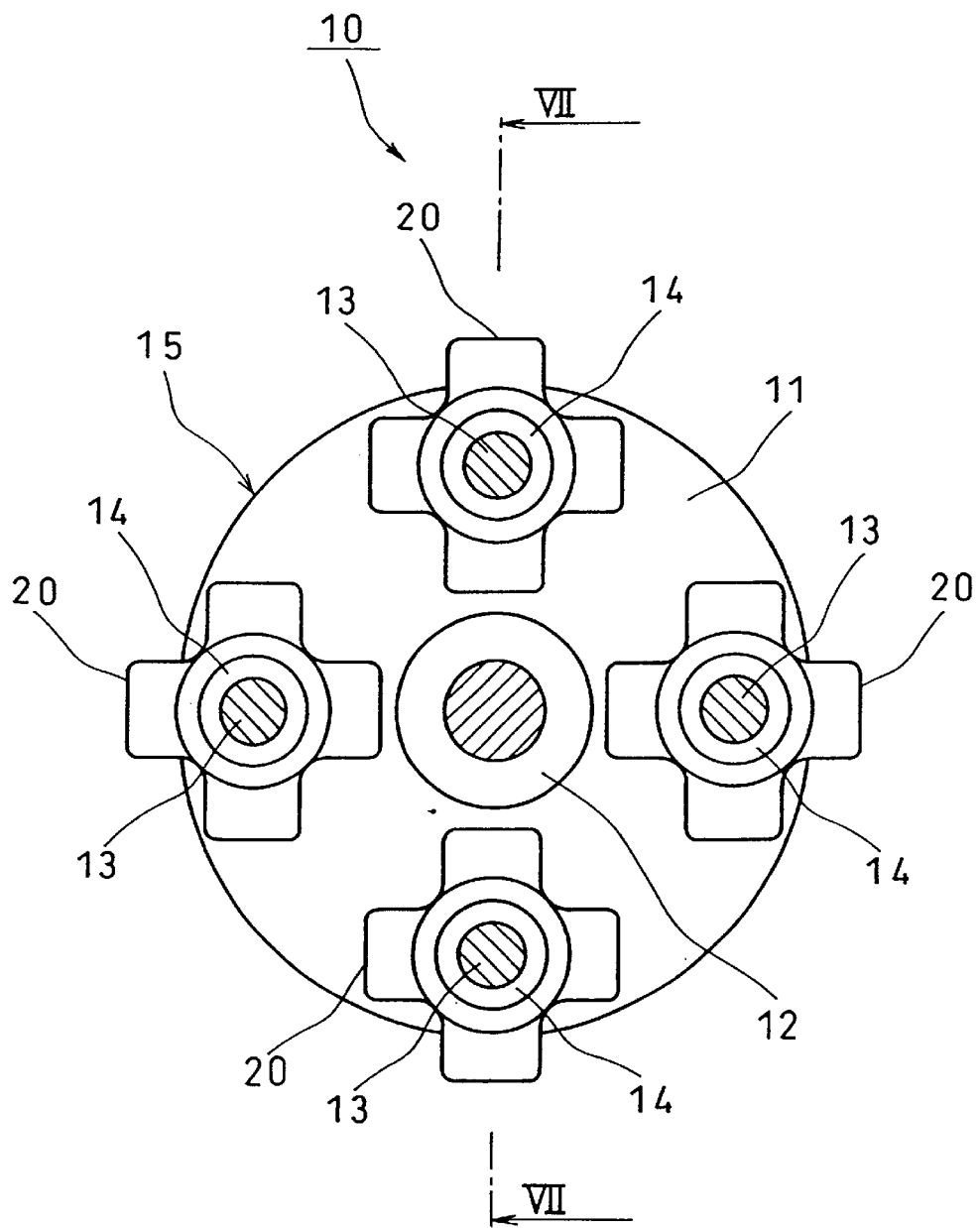
FIG. 6 is a sectional front view (a sectional view taken along the line VI—VI in FIG. 7) showing a cutting device according to Embodiment B-1 of the present invention.
Figure 7:
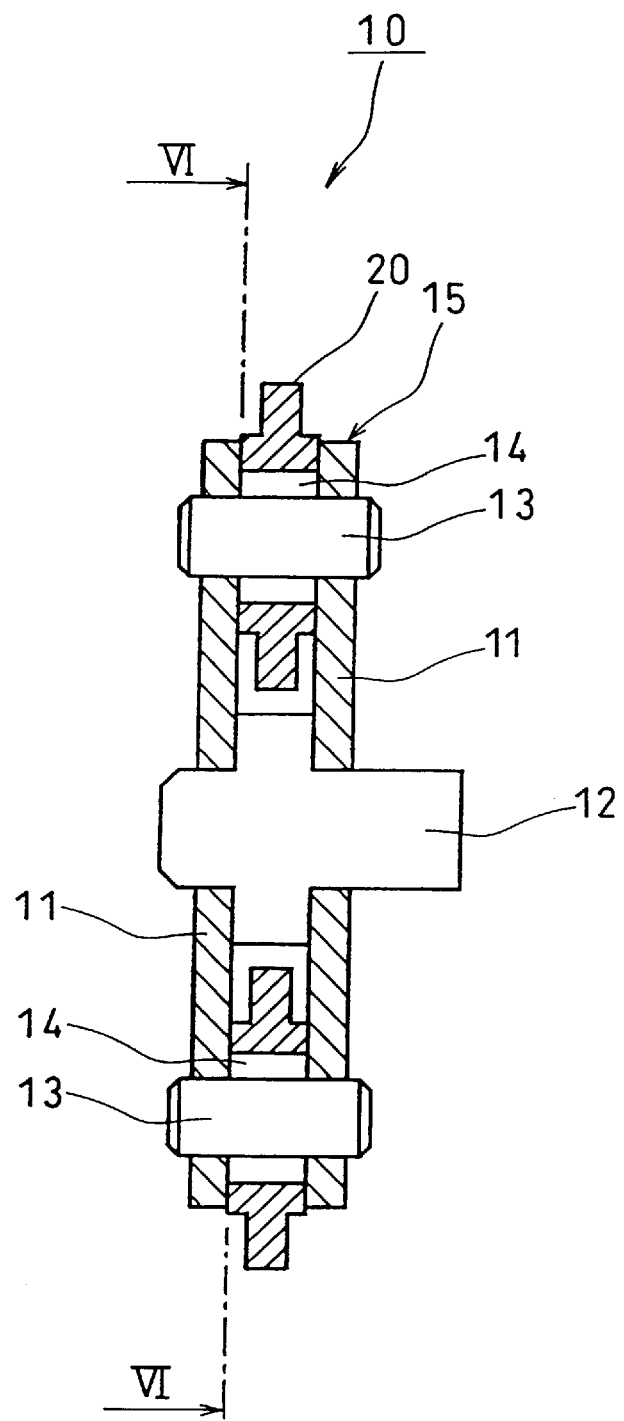
FIG. 7 is a sectional side view, which is taken along the line VII—VII in the cutting device shown in FIG. 6.
Figure 8:
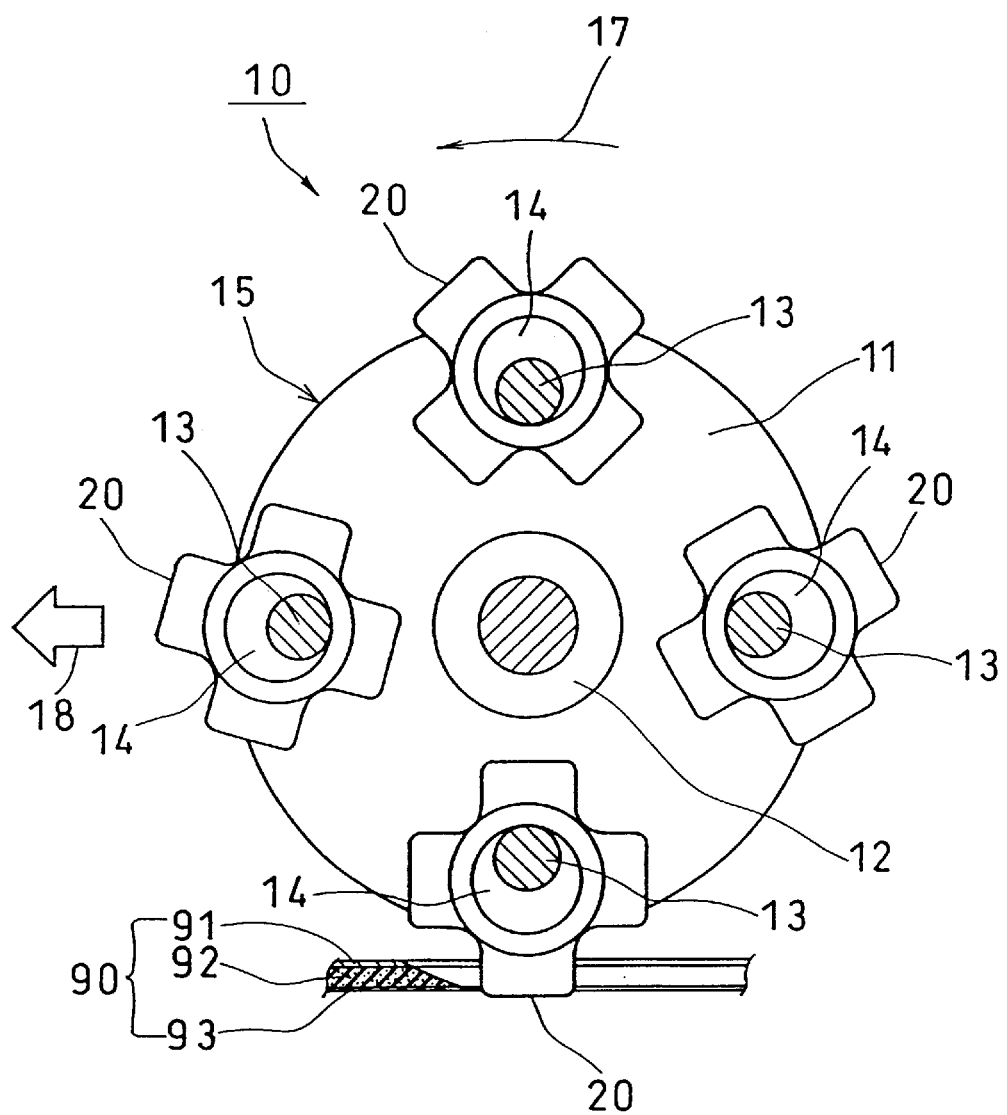
FIG. 8 is a sectional front view showing a state of cutting a workpiece by using the cutting device of Embodiment B-1 of the present invention.
Figure 9B:
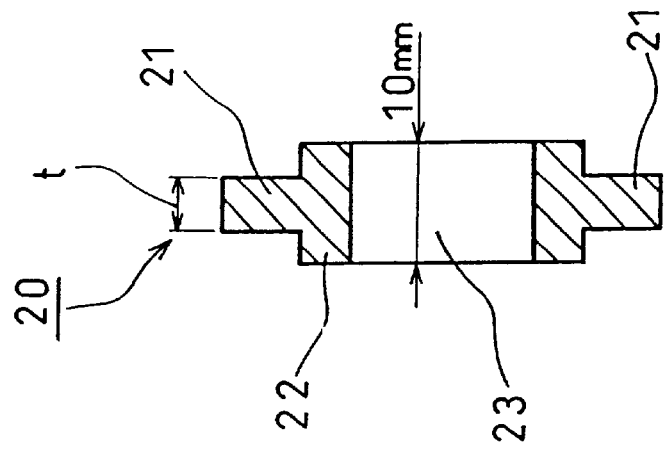
FIG. 9B is a sectional view thereof taken along the line 9B—9B in FIG. 9A seen in an arrow direction.
Figure 9A:
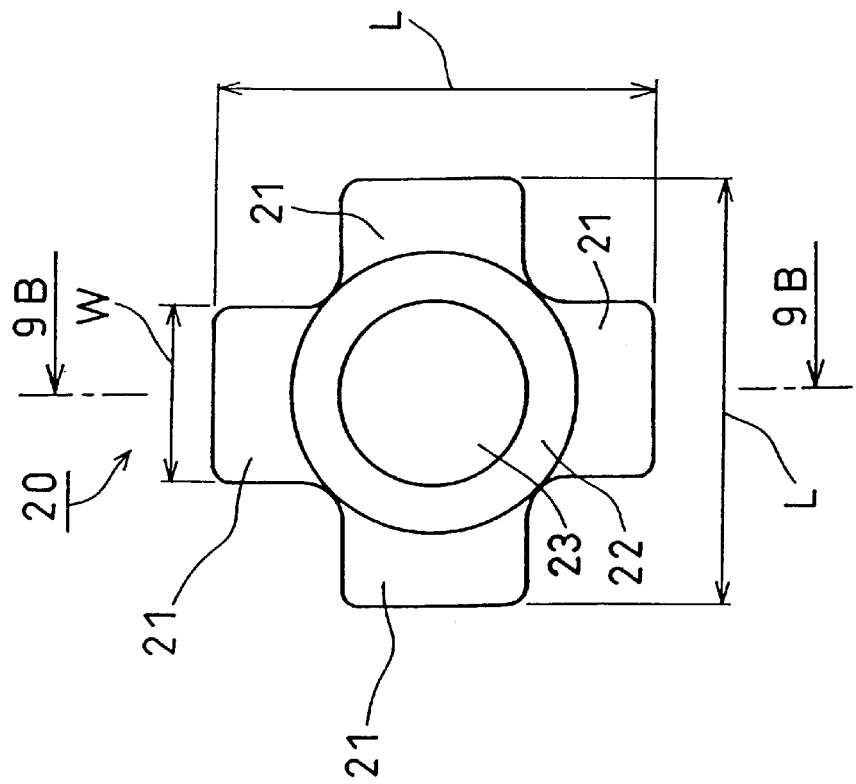
FIG. 9A is a front view showing an impacting body constituting the cutting device of Embodiment B-1 of the present invention.

FIG. 6 is a sectional front view (a sectional view taken along the line VI—VI in FIG. 7) showing a cutting device according to Embodiment B-1 of the present invention, FIG. 7 is a sectional side view, which is taken along the line VII—VII in the cutting device shown in FIG. 6, FIG. 8 is a sectional front view showing the state of cutting a workpiece by using the cutting device shown in FIG. 6, and FIGS. 9A and 9B are views showing an impacting body constituting the cutting device shown in FIG. 6, with FIG. 9A being a front view and FIG. 9B being a sectional view taken along the line 9B—9B in FIG. 9A seen in an arrow direction.

As shown in FIGS. 6 to 8, a cutting device 10 according to Embodiment B-1 includes a rotating unit 15 having a pair of discs (rotors) 11, 11 that are spaced at a predetermined distance and attached to a main shaft 12 with their principal planes opposing each other, and impacting bodies (hard solid bodies) 20 mounted rotatably to spindles 13 provided between the pair of discs (rotors) 11, 11. The main shaft 12 is connected to a rotating shaft of a driving motor, which is not shown in the figure, and the rotating unit 15 is rotated about the main shaft 12 at a high speed to allow the impacting bodies (hard solid bodies) 20 to impact on a workpiece (a heat-insulating housing) 90 at least at the critical impact velocity of the workpiece 90. In the case where the workpiece 90 is formed of a layered body including a steel plate layer 91, a urethane foam layer (a heat insulator) 92 and a resin plate layer 93 as shown in FIG. 8, the impacting bodies 20 are allowed to impact at least at the largest critical impact velocity among those of these layers, namely, the critical impact velocity of the steel plate layer 91. With respect to the rotational speed, a variation of about ±10% is allowable due to the variation in power supply voltage or other reasons.

The impact velocity of the impacting bodies 20 against the workpiece 90 naturally corresponds to the rotational speed of the pair of discs (rotors) 11. The present embodiment employs a rotational speed in a high rotational speed range of 10,000 to 60,000 rpm as the rotational speed of the pair of discs (rotors). The high rotational speed range enables the impact force of the impacting bodies 20 to increase and the lifetime thereof to be extended by an air-cooling effect and work hardening.

In the cutting device 10 shown in FIG. 6, four impacting bodies 20 with a planar shape of cruciform are spaced equally between the principal planes of the discs 11. As shown in FIGS. 9A and 9B, each of the impacting bodies 20 with a planar shape of cruciform is provided with four rectangular projections 21, which are spaced at equal angles, on the peripheral surface of a cylindrical body 22 having a through hole 23. The rectangular projections 21 correspond to cutting blades in a conventional tool and impact on the workpiece. As is apparent from FIG. 6, each of the impacting bodies 20 is positioned so that a part (each rectangular projection, i.e., each cutting blade 21) of its periphery is located beyond the periphery of the discs 11.

Since four impacting bodies 20 are spaced equally between the principal planes of the discs 11, the impacting frequency against the workpiece is at least (10,000 rotations/minute)×four impacting bodies=40,000 times/minute.

A predetermined fitting gap 14 is provided between the spindle 13 and the through hole 23 of the impacting body 20. By providing the fitting gap 14, the impacts on the cutting blades 21 of the impacting bodies 20 and the spindles 13 are relieved although the rotors 11 rotate at a high speed, thus preventing the spindles or the like in the cutting device 10 from being damaged.

Besides the disc type, the rotors 11 may have an arbitrary shape such as a regular polygon. However, as a matter of course, the rotors should be balanced during rotation.

Next, examples of dimensions and materials of the rotors and the impacting bodies are described. In the device according to the embodiment shown in FIG. 6, the disc 11 had a diameter of 100 mm and a plate thickness of 5 mm and was made of carbon steel for machine structural use, the spindle 13 had a diameter of 10 mm and was made of carbon steel for machine structural use or carbon tool steel (JIS code: SK2), the impacting body 20 had a distance L between top parts of two cutting blades of about 42 mm, the through hole 23 with a diameter of 17 mm, the cutting blade 21 with a width W of about 15 mm and a thickness t of about 5 mm and was made of any one material selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430) and manganese steel for machine structural use (SMn433).

In the example of cutting a workpiece, which is shown in FIG. 8, the disc 11 was rotated at 30,000 rpm in the direction indicated by an arrow 17. The impact velocity of the impacting bodies 20 against the workpiece (the layered body of a 1-mm-thick cold-rolled steel sheet 91, a 4-mm-thick urethane foam 92 and a 1-mm-thick ABS resin (acrylonitrile-butadiene-styrene copolymer) 93) 90 with a total thickness of 6 mm was set to be about 157 m/second (565 km/hour) and the moving speed for cutting to be 100 mm/second. The cutting direction was the direction indicated by an arrow 18. In this case, the impacting frequency was (30,000 rotations/minute)×four impacting bodies=120,000 times/minute.

Since the main shaft 12 rotates at a high speed as described above, a great centrifugal force acts on the impacting bodies 20. The centrifugal force causes a high-speed compressive force accompanied with impacts in a limited portion of the workpiece 90 including the surface subjected to the impact by the cutting blades 21 of the impacting bodies 20 and the vicinity of the impact surface. Thus, the top layer of the impact surface of the workpiece 90 is smashed at a high speed instantaneously. Cut scraps are in a minute granular state. It has been confirmed by a test that the workpiece can be cut even when no sharp cutting blade is provided.

In the above, the impact velocity of the impacting bodies 20 is not limited to the above-mentioned specific example and can be set freely depending on the kind of a workpiece, cutting conditions, or the like as long as the impact velocity is at least the critical impact velocity of the workpiece. Similarly, the number of impacts by the impacting bodies 20 per unit time also can be changed depending on the kind of a workpiece, cutting conditions, or the like.

When the material of a workpiece is unknown, when a workpiece is formed of a plurality of different kinds of members, or when a member whose material is unknown hides in a part that cannot be seen from the outside, such a workpiece can be cut excellently by setting the impact velocity of the impacting bodies to be somewhat higher.

With respect to the material for the impacting bodies 20, members other than metallic members also can be used freely as long as they are hard solid bodies.

The number of the rectangular projections (cutting blades) 21 provided in the impacting body 20 is not limited to four as shown in FIGS. 9A and 9B, but may be smaller (two or three) or larger (five or six, for example).

Furthermore, the number of the impacting bodies 20 may be only one or at least two. In the case of providing a plurality of the impacting bodies, it is preferable to provide them at equal angles with respect to the rotational center of the rotors, because this results in equal impact intervals to enable stable cutting. In the case of using only one impacting body, a balancer (a weight) is provided to secure the rotational balance.

Instead of spacing the pair of rotors 11 so as to arrange the impacting bodies therebetween, only one rotor may be used with the spindles provided on one side thereof perpendicularly thereto with a cantilevered support structure, so that the impacting bodies may be provided on these spindles.

The rotor may be driven to rotate at a high speed using a general spindle motor or the like.

The impacting bodies 20 of the present embodiment are not provided with sharp cutting blades as in a conventional cutting tool. The cutting principle of the present embodiment goes beyond a conventional practical sense and enables even brittle members such as metal, resin, glass, ceramics, or the like to be cut without using sharp cutting blades by providing the impacting bodies 20 with a far higher speed than that in a conventional cutting tool.

(Embodiment B-2)

Figure 10:
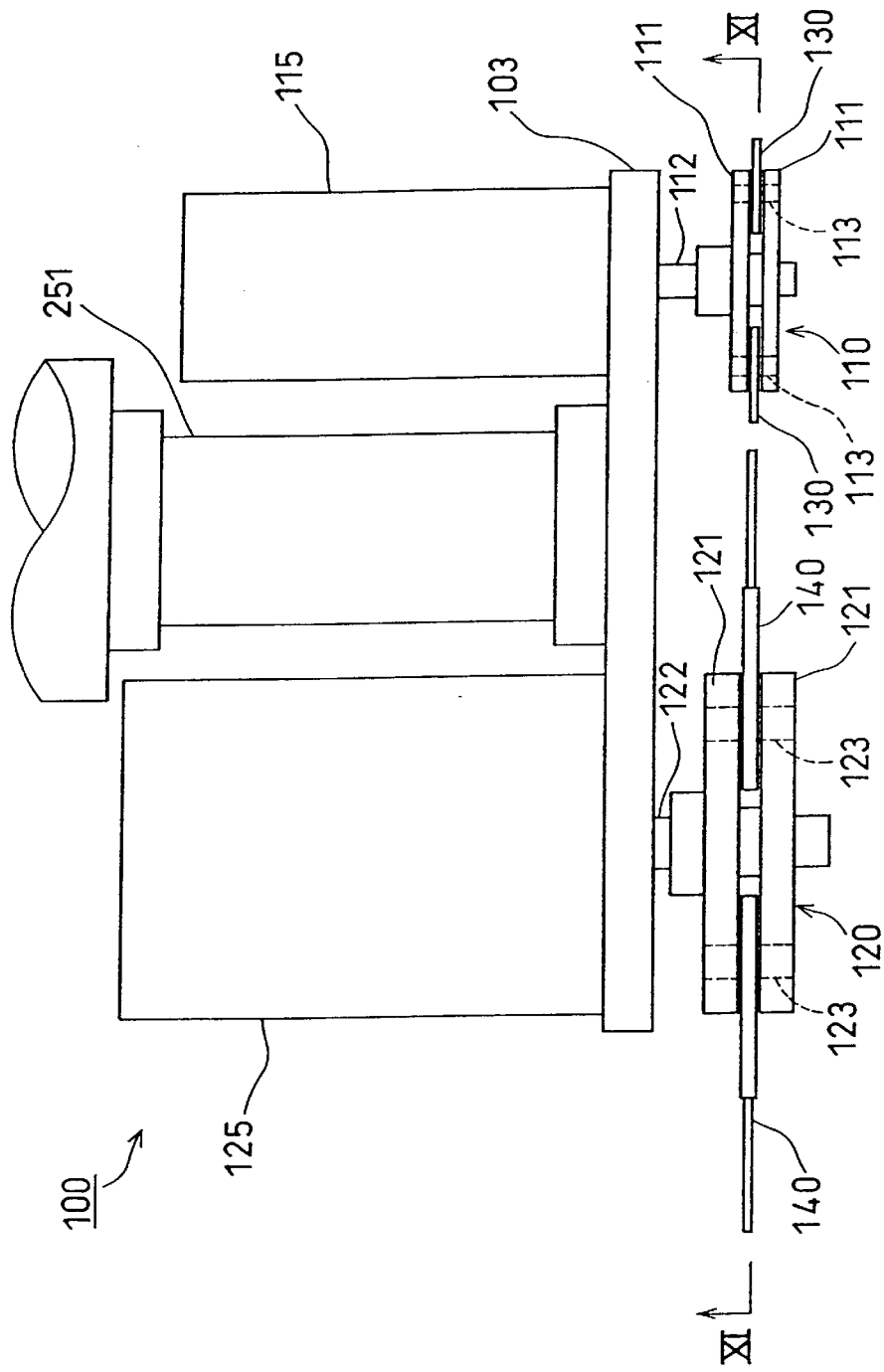
FIG. 10 is a top view showing a cutting device according to Embodiment B-2 of the present invention.
Figure 11:
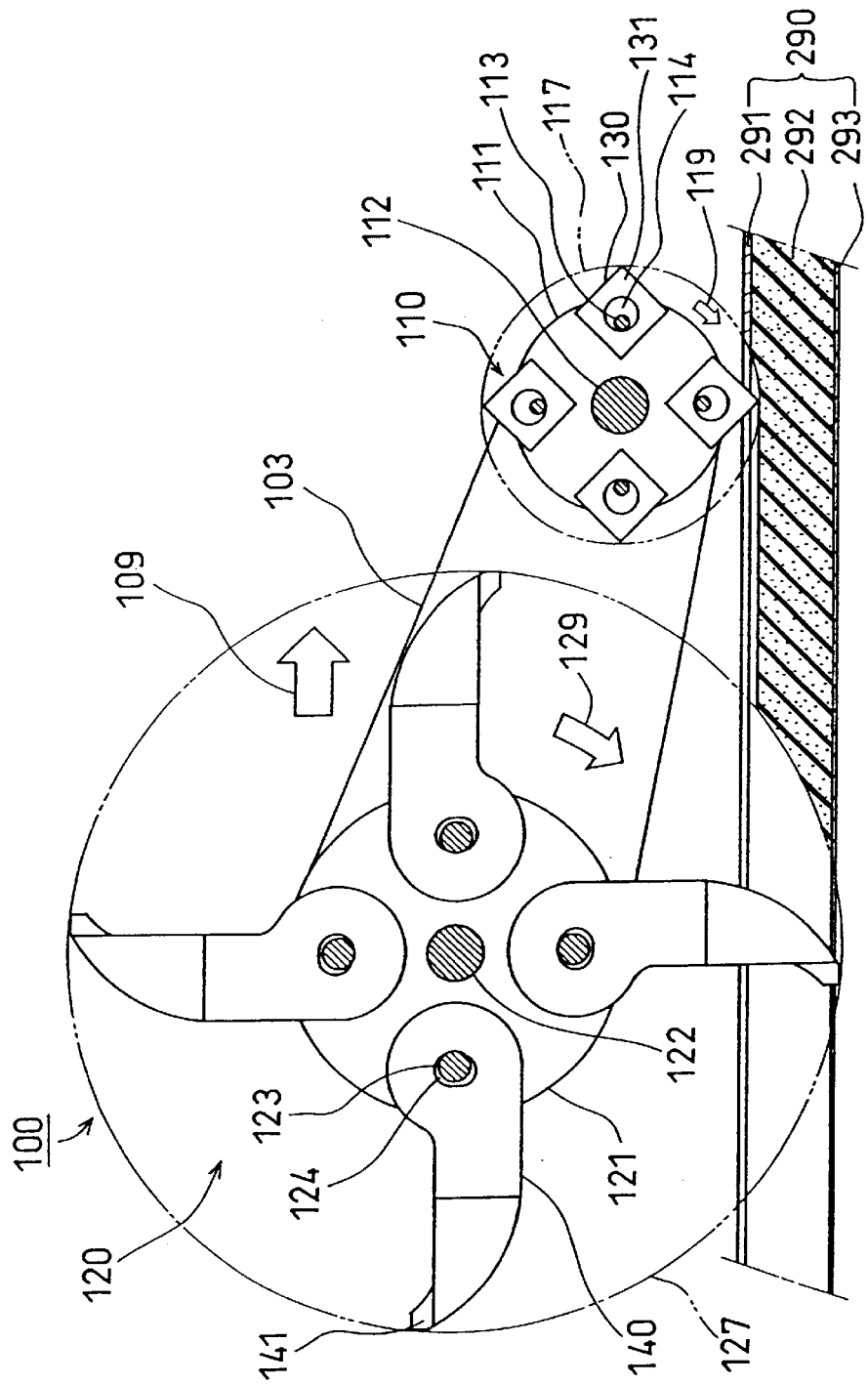
FIG. 11 is a sectional view taken along the line XI—XI in FIG. 10 seen in an arrow direction.

FIG. 10 is a top view showing a cutting device according to Embodiment B-2 of the present invention, and FIG. 11 is a sectional view thereof taken along the line XI—XI in FIG. 10 seen in an arrow direction, showing the state of cutting a workpiece as well.

A cutting device 100 in Embodiment B-2 has a first rotating unit 110 and a second rotating unit 120 as shown in FIGS. 10 and 11.

The first rotating unit 110 has a pair of discs (rotors) 111, 111 that are spaced at a predetermined distance and attached to a main shaft 112 with their principal planes opposing each other, and impacting bodies (hard solid bodies) 130 mounted rotatably to spindles 113 provided between the pair of discs 111, 111. The main shaft 112 is connected to a rotating shaft of a driving motor 115, so that the first rotating unit 110 is rotated about the main shaft 112 serving as a rotational center. Four spindles 113 are provided on the circumference of a circle, whose center corresponds to this rotational center, in such a manner as to be spaced at equal angles.

Similarly, the second rotating unit 120 has a pair of discs (rotors) 121, 121 that are spaced away at a predetermined distance and attached to a main shaft 122 with their principal planes opposing each other, and impacting bodies (hard solid bodies) 140 mounted rotatably to spindles 123 provided between the pair of discs 121, 121. The main shaft 122 is connected to a rotating shaft of a driving motor 125, so that the second rotating unit 120 is rotated about the main shaft 122 serving as a rotational center. Four spindles 123 are provided on the circumference of a circle, whose center corresponds to this rotational center, in such a manner as to be spaced at equal angles.

The first rotating unit 110 and the second rotating unit 120 are held by a common base 103 so that the directions of the axes of rotation thereof are parallel and the principal planes of the discs 111 and the discs 121 are on substantially the same plane, in other words, so that a circular path 117 of cutting blades 131 at the tip of the impacting bodies 130 and a circular path 127 of cutting blades 141 at the tip of the impacting bodies 140 during the rotation substantially are on the same plane. The base 103 is mounted on a robot arm 251.

Figure 12B:
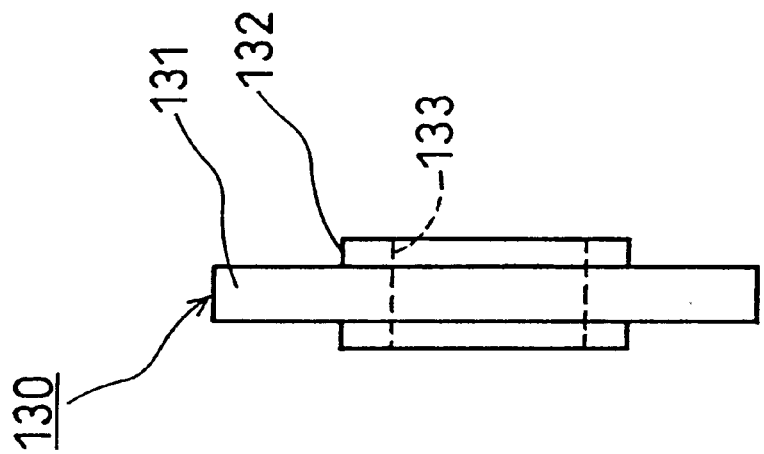
FIG. 12B is a side view thereof.
Figure 12A:
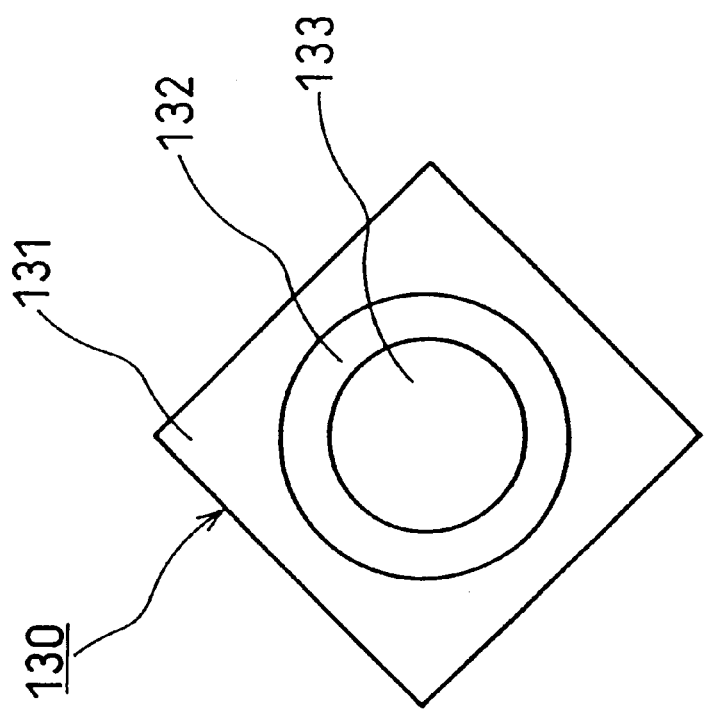
FIG. 12A is a front view showing a specific configuration of a square impacting body constituting the cutting device of Embodiment B-2 of the present invention.

FIGS. 12A and 12B show a specific configuration of the impacting body 130. FIG. 12A is a front view, and FIG. 12B is a side view. As shown in these figures, the square impacting body 130 has a shape such as the one obtained by attaching a cylindrical body 132 with a through hole 133 to the central portion of a plate member with a planar shape of a square and a predetermined thickness. The cylindrical body 132 is made to have a length larger than the thickness of the square plate member, thus securing mechanical strength. Four corners 131 of the square plate member correspond to cutting blades in a conventional tool and impact on the workpiece. The impacting body 130 is attached to the rotating unit 110 by passing the spindle 113 through the through hole 133. As shown in FIGS. 10 and 11, the impacting body 130 is attached so that a part of its periphery (in particular, the cutting blade 131) is located beyond the periphery of the disc 111 when the rotating unit 110 rotates. In the device shown in FIGS. 10 and 11, four impacting bodies 130 are arranged on the principal planes of the discs 111 so as to be spaced equally from each other.

Figures 13A, 13B:
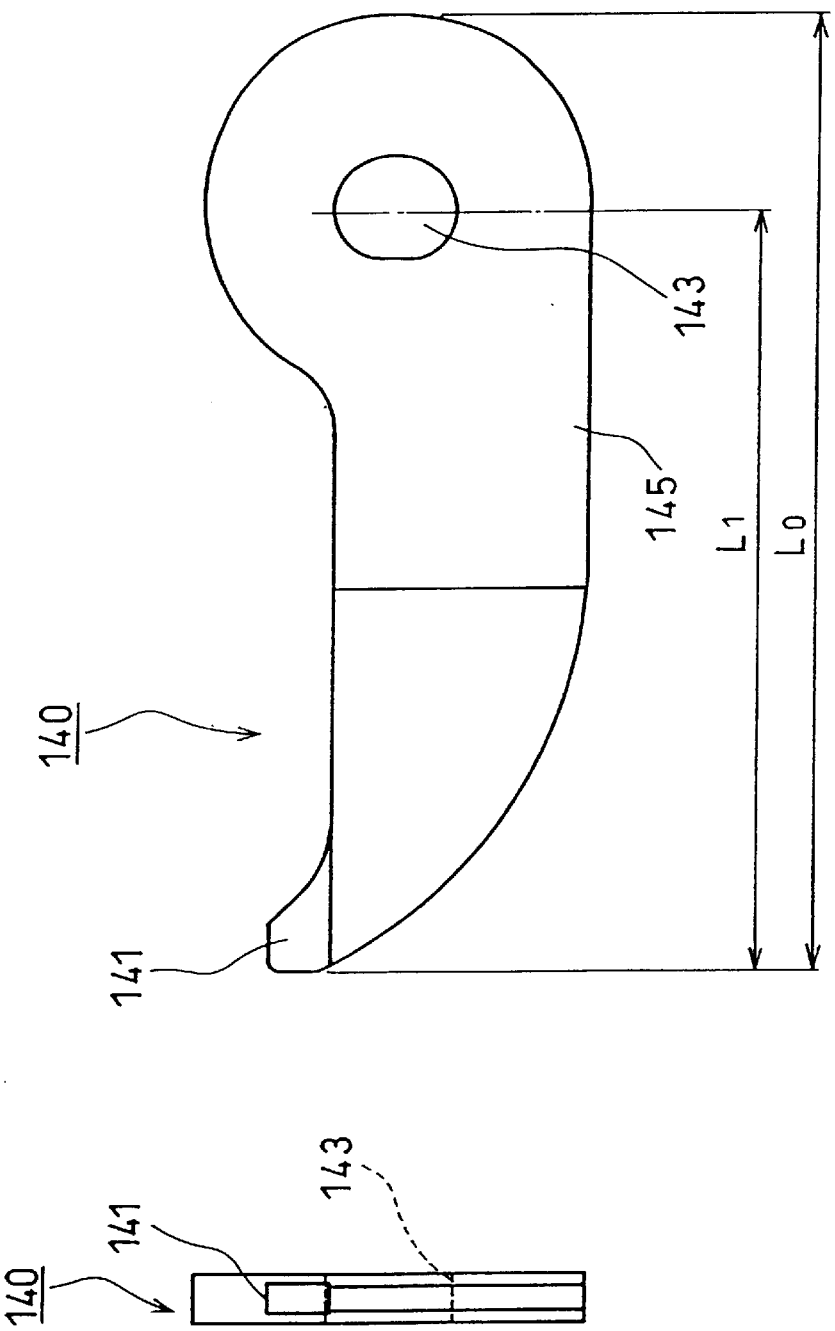
FIG. 13A is a front view showing a specific configuration of a substantially bow-shaped impacting body constituting the cutting device of Embodiment B-2 of the present invention.
FIG. 13B is a side view thereof.

FIGS. 13A and 13B show a specific configuration of the impacting body 140. FIG. 13A is a front view, and FIG. 13B is a side view. As shown in these figures, the substantially bow-shaped impacting body 140 has a floating portion 145, a through hole 143 provided at one end of the floating portion 145 and the cutting blade 141 provided at the other end of the floating portion 145. The floating portion 145 has a shape approximate to a substantially-bow shape that is formed of a substantially circular-arc portion and a chord extending between both ends of the circular-arc, or a substantially-bow shape that is substantially the same as that of pieces obtained by bisecting an ellipse or an oval along its longitudinal direction. The cutting blade 141 is formed to be thick so as to be resistant to shock at the time of impacting on the workpiece, the peripheral portion of the through hole 143 is formed to be thick so as to be resistant to centrifugal force during rotation, and other portions are formed to be thin so as to reduce weight. The impacting body 140 is attached to the rotating unit 120 with its cutting blade 141 facing forward in the rotational direction by passing the spindle 123 through the through hole 143. As shown in FIGS. 10 and 11, the impacting body 140 is attached so that a part of its periphery (in particular, the cutting blade 141) is located beyond the periphery of the disc 121 when the rotating unit 120 rotates. In the device shown in FIGS. 10 and 11, four impacting bodies 140 are arranged on the principal planes of the discs 121 so as to be spaced equally from each other. The planar shape of the through hole 143 preferably is an ellipse as shown in FIGS. 13A and 13B. More accurately, the planar shape of the through hole 143 is a circular-arc elliptical shape that is formed by two circular arcs with different radii whose centers are the center of gravity of the impacting body 140 and semicircles connecting both ends of these two circular arcs in the circumferential direction. By forming the through hole 143 to be a circular-arc elliptical hole whose center is the center of gravity of the impacting body 140, the displacement of the impacting body 140 when the impacting body 140 rebounds in such a manner as to rotate about its center of gravity after impacting on a workpiece can be absorbed well, thus improving the cutting performance. Since a rotationally symmetric impacting body such as the impacting body 130 shown in FIGS. 12A and 12B has a center of gravity substantially corresponding to the center of the through hole 133, the planar shape of the through hole 133 is formed to be circular, thereby absorbing the above-mentioned displacement caused by the rebound at the time of impacting.

A predetermined fitting gap 114 is provided between the spindle 113 and the through hole 133 of the impacting body 130. Similarly, a predetermined fitting gap 124 is provided between the spindle 123 and the through hole 143 of the impacting body 140. By providing the fitting gaps 114, 124, the impacts on the cutting blades 131, 141 and the spindles 113, 123 are relieved when the impacting bodies impact on the workpiece even though the rotors 111, 121 rotate at a high speed, thus preventing components of the rotating units 110, 120 such as the spindles from being damaged.

The following is a description of an example of cutting a workpiece by using the above-described cutting device 100. The description is directed to the case of cutting a workpiece (a heat-insulating housing) 290 having a layered structure including a steel plate layer 291, a urethane foam layer (a heat insulator) 292 and a resin plate layer 293 in this order as shown in FIG. 11. The cutting device 100 and the workpiece 290 are arranged such that the directions of the axes of rotation of the main shafts 112, 122 are substantially parallel with a surface of the plate-like workpiece 290. Then, the cutting device 100 is moved in the direction indicated by an arrow 109 while rotating the first rotating unit 110 and the second rotating unit 120 at a high speed in the directions indicated respectively by arrows 119, 129. The moving direction 109 is parallel with the principal planes of the discs 111, 121 and with the surface of the workpiece 290. Accordingly, the impacting bodies 130 of the first rotating unit 110 first impact on the steel plate layer 291 on the surface of the workpiece 290, and the steel plate layer 291 and a part of the upper portion of the urethane layer 292 are cut, so that a groove having a predetermined width and depth is formed on the upper surface of the workpiece 290. Subsequently, the impacting bodies 140 of the second rotating unit 120 advance along this groove, thus cutting the lower portion of the urethane layer 292 and the resin plate layer 293, which have not been subjected to the impacting bodies 130.

At this time, the rotating units are rotated so that at least either of the impacting bodies 130 or the impacting bodies 140 impact on the workpiece at least at the critical impact velocity of the workpiece 290. In the above example, it is preferable that the impacting bodies 130 impacting on the steel plate layer 291, which is made of a high hardness material and difficult to cut, impact at least at the critical impact velocity of a material of the steel plate layer 291. With respect to the rotational speed, a variation of about ±10% is allowable due to the variation in power supply voltage or other reasons.

The impact velocity of the impacting bodies 130 against the workpiece 290 naturally corresponds to the rotational speed of the pair of discs (rotors) 111. The present embodiment employs a rotational speed in a high rotational speed range of, for example, 10,000 to 60,000 rpm as the rotational speed of the pair of discs 111. The high rotational speed range enables the impact force of the impacting bodies 130 to increase and the lifetime thereof to be extended by an air-cooling effect and work hardening. In the cutting device 100 shown in FIG. 11, four impacting bodies 130 are spaced equally between the principal planes of the discs 111. Therefore, the impacting frequency of the first rotating unit 110 against the workpiece 290 is at least (10,000 rotations/minute)×four impacting bodies=40,000 times/minute.

In the above example, the impacting bodies 140 of the second rotating unit 120 need not be allowed to impact at least at the critical impact velocity of the workpiece 290 (in particular, the urethane layer 292 and the resin plate layer 293). Since the urethane layer 292 and the resin plate layer 293 have a low hardness and do not cause a brittle fracture easily, even when the impacting bodies 140 are allowed to impact at the critical impact velocity of the workpiece or lower, only the vicinity of the part subjected to the impact is smashed and can be cut easily. In such cases, it may be possible to choose to rotate the rotating unit 120 not at a high speed but at a low speed, thereby saving a driving energy. This also eliminates the need for the design that is resistant to a great centrifugal force generated at the time of high-speed rotation, making it possible to reduce the size and weight of the second rotating unit 120 and improve safety. Also, it becomes possible to reduce the size of the driving motor 125. In this way, equipment cost and running cost can be reduced. Of course, there are some cases where, depending on a material of the layer to be cut mainly by the impacting bodies 140 of the second rotating unit 120, the impacting bodies 140 preferably are allowed to impact at least at the critical impact velocity of this material.

As described above, in the cutting device 100 of the present embodiment, the impacting bodies 130 of the first rotating unit 110 cut only the top layer of the workpiece 290, and the impacting bodies 140 of the following second rotating unit 120 cut deeply to the back surface thereof. In the present embodiment, in order that the impacting bodies of these rotating units have different cutting depths, the circular paths 117, 127 of the tips of the cutting blades of the impacting bodies of these rotating units are made to have different radii and the main shafts 112, 122 are made to have different heights above (distances from) the surface of the workpiece 290 as shown in FIG. 11. Simply changing the heights of the axes of rotation (the main shafts) of these rotating units while keeping their configurations completely the same also can change the cutting depths of the impacting bodies of these rotating units. However, there are some cases where the circular path 117 of the first rotating unit 110 preferably is designed to have a smaller radius than the circular path 127 of the second rotating unit 120 by modi-fying the shapes of the impacting bodies as described in the present embodiment. The reason follows. In order to allow the impacting bodies to impact on the workpiece at least at the critical impact velocity, the rotating unit has to be rotated at a high speed. On the other hand, in order to cut the workpiece having a certain thickness, the projecting length of the impacting bodies beyond the disc during rotation has to be longer than the thickness of the workpiece. Thus, there is a lower limit of the size of the impacting body. When a large impacting body is attached to the rotating unit, the weight of the impacting body and the distance from the rotational center to the center of gravity of the impacting body increase. Therefore, as the impacting body becomes larger, the centrifugal force generated at the time of high-speed rotation increases in an accelerating manner. As a result, it becomes necessary to design the device having a mechanical strength that can withstand this centrifugal force, leading to a further increase in weight and costs. Accordingly, when cutting the workpiece 290 having a layered structure and whose surface and back layers have different critical impact velocities as in the above example, the workpiece is disposed so that the steel plate layer 291 having a large critical impact velocity can be cut first and the circular path 117 of the first rotating unit 110 cutting the steel plate layer 291 is made to be smaller than the circular path 127 of the second rotating unit 120. Consequently, the size of the impacting bodies 130 of the first rotating unit 110 can be reduced, and thus their radius of gyration also decreases, thus realizing a high-speed rotation of the first rotating unit 110 easily. On the other hand, since the rotational speed of the second rotating unit 120 cutting the urethane layer 292 and the resin plate layer 293 having a relatively small critical impact velocity can be made lower than that of the first rotating unit 110, the strength design can be carried out relatively easily even when providing large impacting bodies 140. Because a heat-insulating housing of a refrigerator usually has a steel plate as an outer wall plate and a resin plate as an inner wall plate, the cutting device of the present embodiment is used to cut/process the housing from outside, thus allowing the cutting as illustrated in FIG. 11.

The cutting device of Embodiment B-2 includes at least two rotating units. This has the following effects compared with the device of Embodiment B-1, which cuts the workpiece at one time with only a single rotating unit. For example, when the workpiece is thick, the projecting length of the impacting bodies beyond the disc at the time of rotation has to be greater than the workpiece thickness in order to cut the workpiece at one time with only one rotating unit. This increases the size and weight of the impacting bodies. In order to rotate them at a high speed, the mechanical strength needs to be improved, leading to an increase in the weight of the rotating unit and higher costs as described above. Also, when cutting the workpiece formed by layering different kinds of materials, the impacting bodies have to be allowed to impact at least at the largest critical impact velocity among those of the layered materials in order to cut the workpiece at one time with only one rotating unit. Thus, it is necessary to rotate the rotating unit at a high speed, and therefore, the strength design and driving mechanism of the rotating unit have to be brought into correspondence with such a rotation, which brings about much waste. Furthermore, when attempting to cut the workpiece 290 at one time with only the second rotating unit 120 provided with, for example, the substantially bow-shaped impacting bodies 140 with longer projecting lengths, the impact on the difficult-to-machine steel plate layer 291 causes each impacting body 140 to rebound and rotate about the spindle

123 and then interfere with the impacting body 140 positioned toward the back in the rotational direction, which is supposed to impact on the workpiece subsequently. Also, when the workpiece is thick, the speed of the impacting body lowers at some midpoint in the thickness direction of the workpiece, and then this impacting body interferes with the subsequent impacting body 140 within the workpiece. Such interferences between the impacting bodies deteriorate the cutting efficiency and the reliability of the cutting device. When the intervals between the impacting bodies are increased for the purpose of preventing the interference therebetween, the number of the impacting bodies declines, leading to fewer impacting times and lower cutting efficiency. For the above reasons, the workpiece is cut by sequentially increasing the cutting depth using a plurality of the cutting units, thereby achieving an excellent cutting performance with respect to a thick workpiece and a workpiece formed by layering different kinds of materials. As becomes clear from the above, when the workpiece is relatively thin, it is of course possible to cut the workpiece at one time with only a single rotating unit illustrated in Embodiment B-1.

Besides the disc type, the rotors 111, 121 may have an arbitrary shape such as a regular polygon. However, as a matter of course, the rotors should be balanced during rotation.

Next, examples of dimensions and materials of the rotors and the impacting bodies are described. In the cutting device according to the embodiment shown in FIGS. 10 and 11, the disc 111 had a diameter of 100 mm and a plate thickness of 5 mm and was made of carbon steel for machine structural use, and the disc 121 had a diameter of 200 mm and a plate thickness of 10 mm and was made of carbon steel for machine structural use. The spindle 113 had a diameter of 10 mm and was made of carbon steel for machine structural use or carbon tool steel (JIS code: SK2), and the spindle 123 had a diameter of 21 mm and was made of carbon steel for machine structural use or carbon tool steel (JIS code: SK2). The impacting body 130 had a 34.2 mm×34.2 mm square plate member with a thickness of 5 mm, the cylindrical body 132 with an outer diameter of 25 mm and a length of 10 mm and the through hole 133 with an inner diameter of 17 mm. The impacting body 140 had a total length L0 of 200 mm, a length L1 from substantially the center of the through hole 143 to the end of the cutting blade 141 of 160 mm, the through hole 143 thereof had an inner dimension along its lengthwise direction of 26 mm and that along its widthwise direction of 22 mm, and the cutting blade 141, the peripheral portion of the through hole 143 and the other portions had a thickness of 6 mm, 10 mm and 5 mm, respectively, as shown in FIGS. 13A and 13B. The impacting bodies 130 and 140 were made of any one material selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430) and manganese steel for machine structural use (SMn433).

In the example of cutting a workpiece, which is shown in FIGS. 10 and 11, the disc 111 was rotated at 30,000 rpm in the direction indicated by an arrow 119, and the impact velocity of the impacting bodies 130 against the steel plate layer 291 (a 1-mm-thick cold-rolled steel sheet) as the top layer of the workpiece 290 was set to be about 157 m/second (565 km/hour). Also, the disc 121 was rotated at 3000 rpm in the direction indicated by an arrow 129, and the impact velocity of the impacting bodies 140 against the urethane layer 292 (a 60-mm-thick urethane foam) and the resin plate layer 293 (a 1-mm-thick ABS resin (acrylonitrile-butadiene-styrene copolymer)) of the workpiece 290 was set to be about 72 m/second (260 km/hour). The workpiece 290 was fixed, and the robot arm 251 is controlled to move the cutting device 100 at the moving speed for cutting of 50 mm/second in the direction indicated by an arrow 109. In this case, the impacting frequencies were (30,000 rotations/minute)×four impacting bodies=120,000 times/minute for the impacting bodies 130 and (3,000 rotations/minute)×four impacting bodies=12,000 times/minute for the impacting bodies 140.

Since the main shaft 112 rotates at a high speed as described above, a great centrifugal force acts on the impacting bodies 130. The centrifugal force causes a high-speed compressive force accompanied with impacts in a limited portion of the steel plate layer 291 including the surface subjected to the impact by the cutting blades 131 of the impacting bodies 130 and the vicinity of the impact surface. Thus, the top layer of the impact surface of the steel plate layer 291 is smashed at a high speed instantaneously. Cut scraps are in a minute granular state. It has been confirmed by a test that the workpiece can be cut even when no sharp cutting blade is provided.

The impact velocity of the impacting bodies 140 against the urethane layer 292 and the resin plate layer 293 are not greater than the critical impact velocity of materials for these layers. Even when the impacting bodies 140 are allowed to impact on these layers at their critical impact velocity or lower, unlike the case of the difficult-to-machine iron layer, only the vicinity of the part subjected to the impact is smashed and the fracture does not propagate widely. Thus, the workpiece 290 can be cut substantially along the groove formed by the impacting bodies 130.

In the above, the impact velocities of the impacting bodies 130, 140 are not limited to the above-mentioned specific example and can be set freely depending on the kind of a workpiece, cutting conditions, or the like as long as at least either of them is at least the critical impact velocity of the workpiece (when the workpiece is formed of a layered body including a plurality of layers, the impact velocity of the impacting bodies cutting the layer that is most difficult to cut in view of physical properties such as hardness, brittleness and strength is considered to be at least at the critical impact velocity of the material for this layer). Similarly, the number of impacts by the impacting bodies 130, 140 per unit time also can be changed depending on the kind of a workpiece, cutting conditions, or the like.

When the material of a workpiece is unknown, when a workpiece is formed of a plurality of different kinds of members, or when a member whose material is unknown hides in a part that cannot be seen from the outside, such a workpiece can be cut excellently by setting the impact velocity of the impacting bodies to be somewhat higher.

With respect to the material for the impacting bodies, members other than metallic members also can be used freely as long as they are hard solid bodies.

Furthermore, the number of the impacting bodies provided in one rotating unit may be only one or at least two. In the case of providing a plurality of the impacting bodies, it is preferable to provide them at equal angles with respect to the rotational center of the rotors, because this results in equal impact intervals to allow stable cutting. In the case of using only one impacting body, a balancer (a weight) is provided to secure the rotational balance.

It is preferable that the cutting blade of the impacting body provided in the following rotating unit is designed to have substantially the same thickness as or to be thinner than that provided in the foregoing rotating unit, which cuts into the workpiece earlier. By cutting into the workpiece with the impacting bodies having the same thickness or with decreasing thickness, the following impacting bodies reliably can fit into a groove-like incised portion formed on the workpiece by the foregoing impacting bodies.

Moreover, instead of spacing the pair of rotors so as to arrange the impacting bodies therebetween, only one rotor may be used with the spindles provided on one side thereof perpendicularly thereto with a cantilevered support structure, so that the impacting bodies may be provided on these spindles.

The rotor may be driven to rotate at a high speed using a general spindle motor or the like.

The number of the rotating units is not limited to two as described above but may be three or more. If three or more rotating units are used and the workpiece is cut sequentially by increasing the cutting depth of the impacting bodies of these units as described above, such a workpiece can be cut excellently even when the workpiece is thick or has a multilayered structure. In such cases, it is preferable that the impacting bodies of these rotating units are allowed to impact on the workpiece at least at the critical impact velocity of each material of the workpiece to be cut by the respective units. However, as is already mentioned, there are some cases where, depending on a material of the workpiece, the workpiece can be cut without any problems even when not all the impacting bodies of a plurality of the rotating units is allowed to impact at least at the critical impact velocity.

For example, when the steel plate layer 291 as the top layer of the workpiece 290 is thick and thus the entire thickness thereof is difficult to cut at one time with the first rotating unit in the above example, a third rotating unit that has substantially the same configuration with the first rotating unit is provided between the first rotating unit and the second rotating unit in the cutting device shown in FIGS. 10 and 11. Then, the cutting depth is increased in the order of the first, third and second rotating units, thus cutting the steel plate layer 291 with the first rotating unit and the third rotating unit. In this case, it is needless to say that the impacting bodies of the first and third rotating units preferably are allowed to impact on the steel plate layer 291 at least at the critical impact velocity of the steel plate layer 291.

The plurality of the rotating units constituting the cutting device do not have to be attached to the common base as in the above example, but may be supported and moved individually so as to move along cutting positions on the workpiece sequentially. However, when they are mounted on the common base, it is possible to control the movement of the cutting device as one piece, allowing a simplification of equipment and const reduction.

In addition, although the workpiece was cut by moving the cutting device while fixing the workpiece in the above example, it also may be cut by moving the workpiece while fixing the cutting device at a predetermined position.

As described above, the impacting bodies of the present embodiment are not provided with sharp cutting blades as in a conventional cutting tool. The cutting principle of the present embodiment goes beyond a conventional practical sense and enables even brittle members such as metal, resin, glass, ceramics, or the like to be cut by a single cutting device without using sharp cutting blades by providing the impacting bodies with a far higher speed than that in a conventional cutting tool.

(Embodiment B-3)

Impacting bodies to be attached to the cutting devices described in Embodiments B-1 and B-2 are not limited to those shown in FIGS. 9A and 9B, FIGS. 12A and 12B and FIGS. 13A and 13b, but can be those with various shapes. In the following, examples of usable shapes of impacting bodies will be described.

Figure 14B:
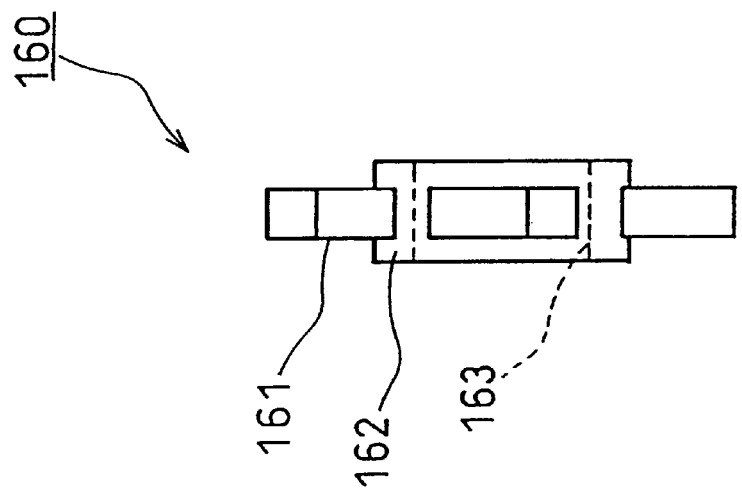
FIG. 14B is a side view thereof.
Figure 14A:
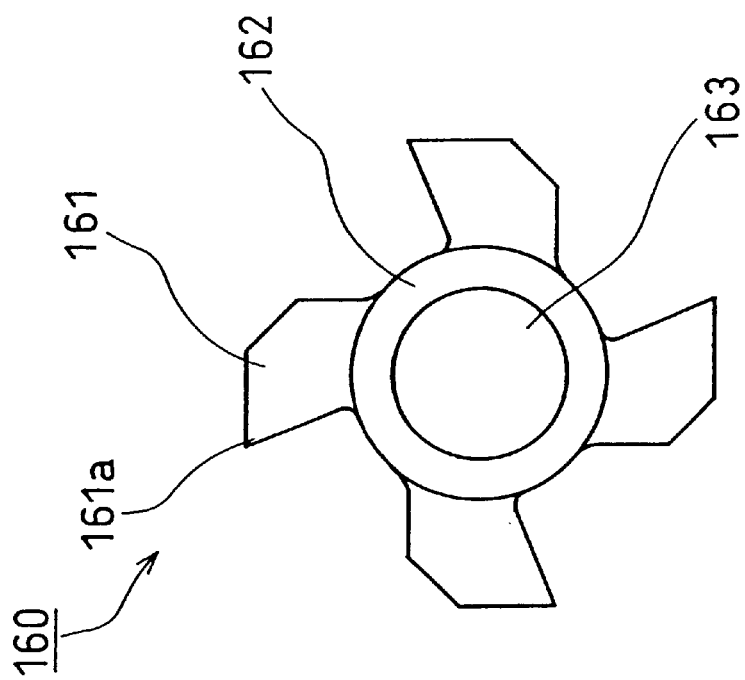
FIG. 14A is a front view showing a modified cruciform impacting body.

FIGS. 14A and 14B show a modified cruciform impacting body as another example of an impacting body having projections at substantially equal angles on its periphery as shown in FIGS. 9A and 9B, with FIG. 14A being a front view and FIG. 14B being a side view. A modified cruciform impacting body 160 is formed by modifying the shape of the rectangular projections 21 in the cruciform impacting body 20 shown in FIGS. 9A and 9B. In other words, the modified cruciform impacting body 160 has four substantially parallelogram projections 161, which are spaced at equal angles in a circumferential direction, on the peripheral surface of a cylindrical body 162 having a through hole 163. The projections 161 are attached so that an acute end 161a on a periphery of each projection 161 faces the direction of impacting on the workpiece. The number of the substantially parallelogram projections 161 is not limited to four as in the present example but may be less (two, three) or more (for example, five, six). Also, instead of the substantially parallelogram projections 161, projections such as substantially triangle projections, arch-shaped projections or substantially semicircular projections also may be provided in such a manner as to be spaced away at equal angles.

Figures 15A, 15B:
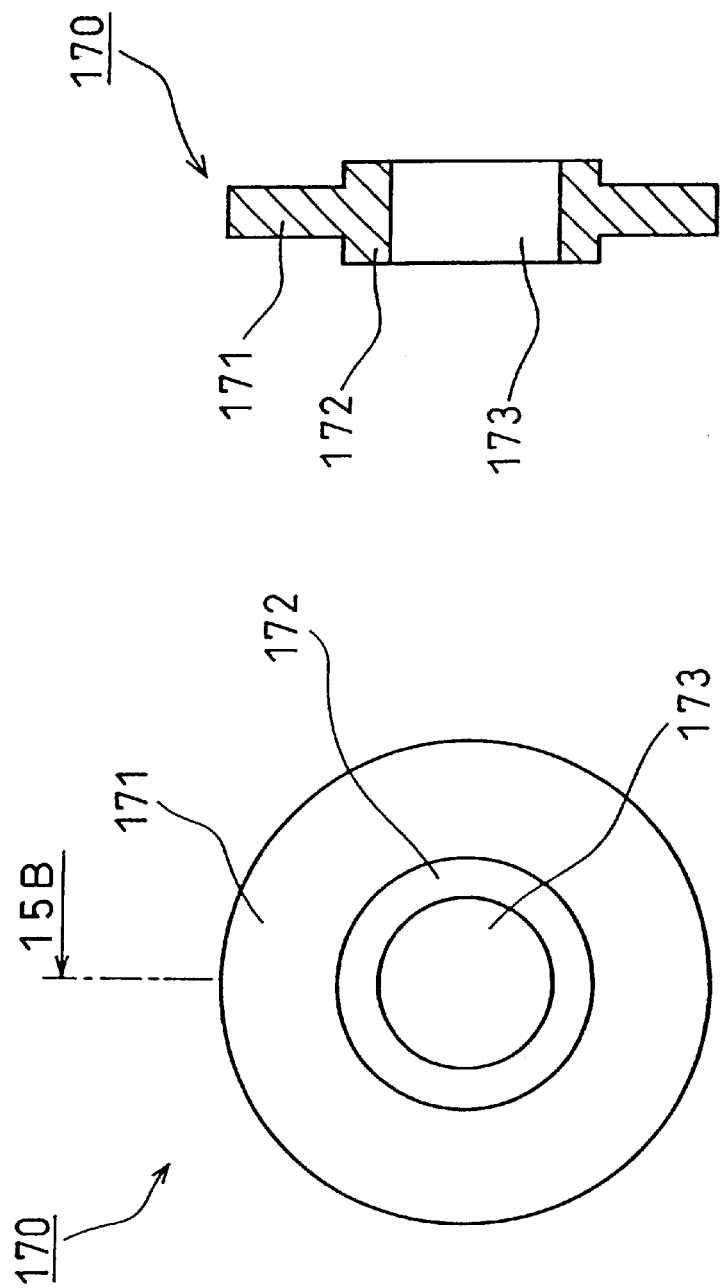
FIG. 15A is a front view showing a disc-shaped impacting body.
FIG. 15B is a sectional view thereof taken along the line 15B—15B in FIG. 15A seen in an arrow direction.

FIGS. 15A and 15B show a disc-shaped impacting body 170, with FIG. 15A being a front view and FIG. 15B being a sectional view taken along the line 15B—15B in FIG. 15A seen in an arrow direction. The disc-shaped impacting body 170 has a shape such as the one obtained by inserting a cylindrical body 172 with a through hole 173 into the central portion of a ring cutting blade 171 with a predetermined thickness.

FIGS. 16A and 16B show a regular-hexagonal impacting body, with FIG. 16A being a front view and FIG. 16B being a sectional view taken along the line 16B—16B in FIG. 16A seen in an arrow direction. The regular-hexagonal impacting body 180 has a shape such as the one obtained by inserting a cylindrical body 182 with a through hole 183 into the central portion of a plate member with an outer shape of regular hexagon and a predetermined thickness. Six corners 181 on the periphery of the plate member serve as cutting blades. Instead of the regular hexagon, the plate member can have an outer shape of other regular polygons such as a regular triangle, a regular pentagon and a regular octagon.

Figure 17B:
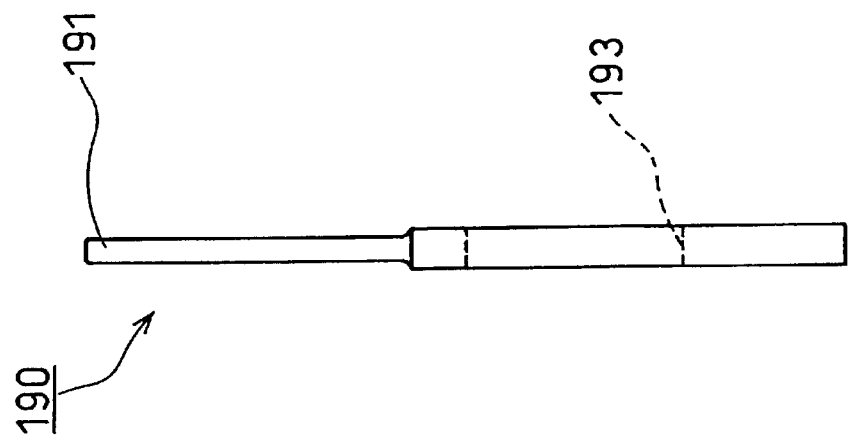
FIG. 17B is a side view thereof.
Figure 17A:
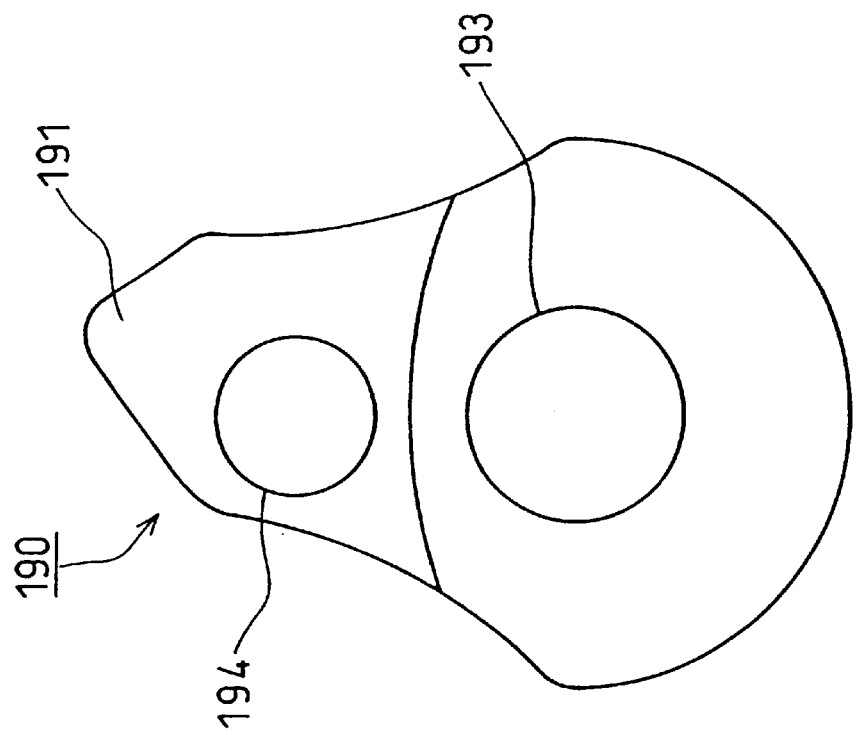
FIG. 17A is a front view showing a substantially bell-shaped impacting body.

FIGS. 17A and 17B show a substantially bell-shaped impacting body, with FIG. 17A being a front view and FIG. 17B being a side view. A substantially bell-shaped impacting body 190 has a planar shape of a bell shape or a suitable variation thereof. An end corresponding to the portion on which the bell is suspended is a cutting blade 191 for impacting on the workpiece, and a wide region on the opposite side is provided with a through hole 193 through which a spindle is passed. Furthermore, a through hole 194 is provided for reducing weight, and the region in which the through hole 194 is formed is thinner than the region in which the through hole 193 is formed.

Figure 18B:
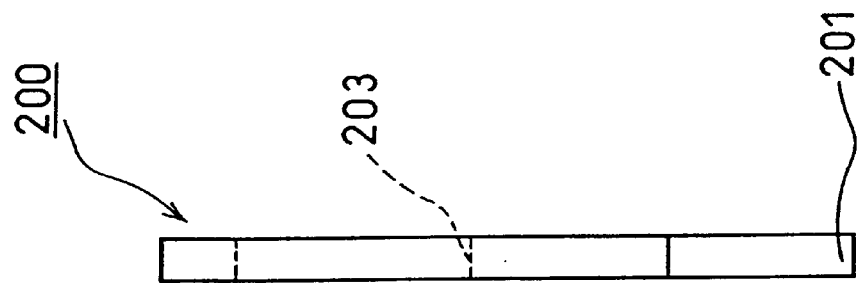
FIG. 18B is a side view thereof.
Figure 18A:
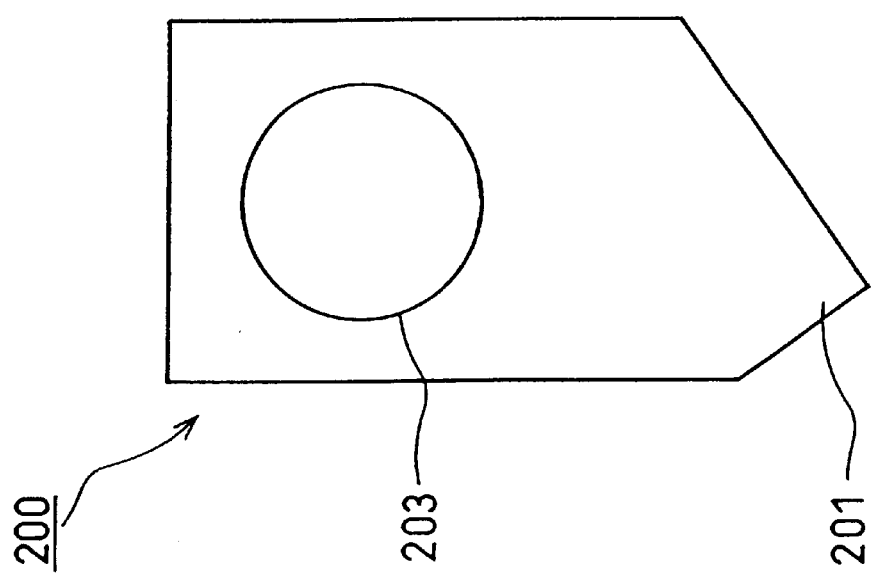
FIG. 18A is a front view showing a modified pentagonal impacting body.

FIGS. 18A and 18B show a modified pentagonal impacting body, with FIG. 18A being a front view and FIG. 18B being a side view. A modified pentagonal impacting body 200 has a planar shape that is substantially the same as a pentagon obtained by cutting off corners on both sides on one shorter side of a rectangle. A resultant corner at the tip formed by cutting off the corners on the both sides is a cutting blade 201 for impacting on the workpiece. On the opposite side, a through hole 203 through which a spindle is passed is formed.

Figure 19A:
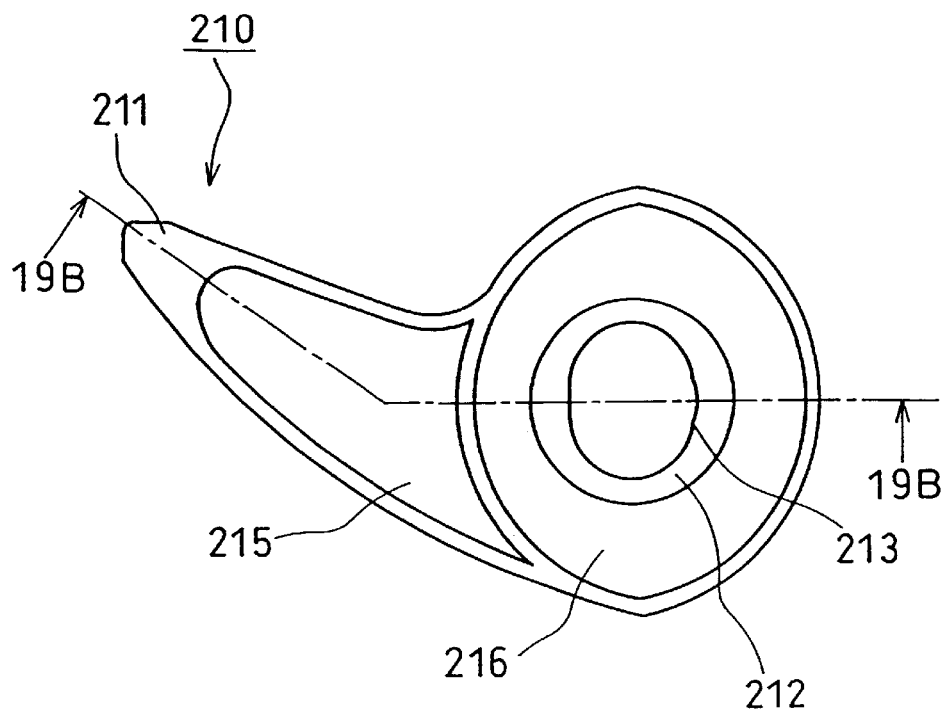
FIG. 19A is a front view showing a substantially "9"-shaped impacting body.
Figure 19B:
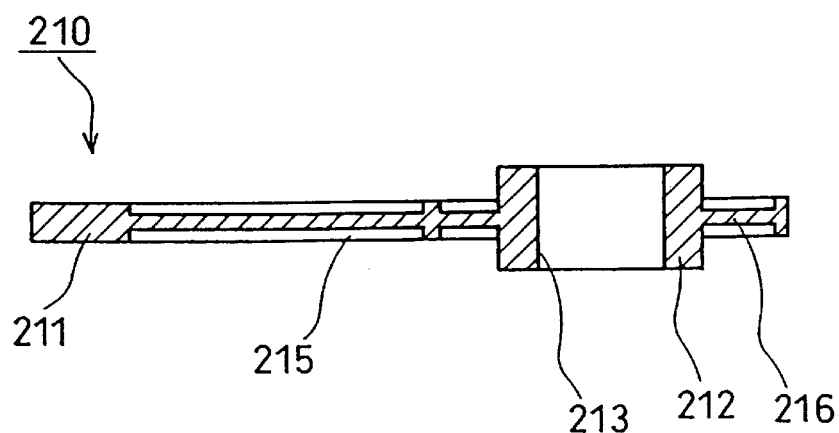
FIG. 19B is a sectional view thereof taken along the line 19B—9B in FIG. 19A seen in an arrow direction.

FIGS. 19A and 19B show a substantially "9"-shaped impacting body, with FIG. 19A being a front view and FIG. 19B being a sectional view taken along the line 19B—19B in FIG. 19A seen in an arrow direction. A substantially "9"-shaped impacting body 210 has a substantially disc-shaped plate 216 having a substantially circular (or substantially oval) shape and a wedge-shaped portion 215, which are connected so as to form a substantially "9" shape or a substantially "," (comma) shape. An end of the wedge-shaped portion 215 is a cutting blade 211 for impacting on the workpiece. In addition, the substantially central portion of the substantially disc-shaped plate 216 is provided with a through hole 213 through which a spindle is passed, and the periphery thereof is formed to be thick for raising mechanical strength. Furthermore, edge portions of the substantially disc-shaped plate 216 and the wedge-shaped portion 215 are formed to be thick and inner regions thereof are formed to be thin for reducing weight while maintaining the necessary mechanical strength.

FIGS. 20A and 20B show a substantially bow-shaped impacting body, with FIG. 20A being a front view and FIG. 20B being a side view. A substantially bow-shaped impacting body 220 shown in FIGS. 20A and 20B is an example of modifying the substantially bow-shaped impacting body 140 shown in FIGS. 13A and 13B. As the substantially bow-shaped impacting body 140 shown in FIGS. 13A and 13B, the substantially bow-shaped impacting body 220 has a substantially bow-shaped floating portion 225, a through hole 223 having a circular-arc elliptical shape provided at one end of the floating portion 225 and a cutting blade 221 provided at the other end of the floating portion 225. The substantially bow-shaped impacting body 220 is different from the substantially bow-shaped impacting body 140 shown in FIGS. 13A and 13B in the following points. First, the peripheral region of the through hole 223 through which a spindle is passed is formed to be still thicker, thus improving a mechanical strength to resist a centrifugal force generated at the time of rotation. Second, the floating portion 225 is provided with through holes 224 so as to reduce weight, thus reducing the centrifugal force generated at the time of rotation.

FIGS. 21A and 21B show another example of a substantially bow-shaped impacting body, with FIG. 21A being a front view and FIG. 21B being a side view. A substantially bow-shaped impacting body 230 shown in FIGS. 21A and 21B is an example of modifying the substantially bow-shaped impacting body 140 shown in FIGS. 13A and 13B. The substantially bow-shaped impacting body 230 has a floating portion 235 as the substantially bow-shaped impacting body 140 shown in FIGS. 13A and 13B, but a portion corresponding to the chord of the bow is bent in the same direction as the substantially circular arc portion in the impacting body 230, whereas it is a straight line in the impacting body 140 shown in FIGS. 13A and 13B. As in the substantially bow-shaped impacting body 140 shown in FIGS. 13A and 13B, a through hole 233 having a circular-arc elliptical shape is formed at one end of the floating portion 235 and a cutting blade 231 is formed at the other end of the floating portion 235. In addition, as in the substantially bow-shaped impacting body 220 shown in FIGS. 20A and 20B, the peripheral region of the through hole 233 through which a spindle is passed is formed to be thick, thus improving a mechanical strength to resist a centrifugal force generated at the time of rotation.

The impacting body can have various shapes other than the above as long as it has a through hole through which a spindle can be passed and a cutting blade to impact on the workpiece. Furthermore, the tips of the through hole and the cutting blade may be made thick for raising the mechanical strength, while a through hole may be provided suitably or the plate thickness may be reduced partially so as to reduce weight for the purpose of reducing the centrifugal force generated at the time of rotation.

Among the impacting bodies described above, impacting bodies that are rotationally symmetric with respect to an axis of the through hole through which a spindle is inserted such as the impacting body 20 (FIGS. 9A and 9B), the impacting body 130 (FIGS. 12A and 12B), the impacting body 160 (FIGS. 14A and 14B), the impacting body 170 (FIGS. 15A and 15B) and the impacting body 180 (FIGS. 16A and 16B) have a smaller projecting length beyond the rotor but can achieve lighter weight. Therefore, they can be used suitably as an impacting body of a rotating unit rotating at a very high speed or a rotating unit that does not require a great cutting depth (the first rotating unit 110 in the example of Embodiment B-2). On the other hand, impacting bodies provided with a through hole through which a spindle is inserted at one end of an oblong floating portion such as the impacting body 140 (FIGS. 13A and 13B), the impacting body 220 (FIGS. 20A and 20B) and the impacting body 230 (FIGS. 21A and 21B) can achieve a larger projecting length beyond the rotor so as to obtain a greater cutting depth, but are a relatively heavy and have the center of gravity far from an axis of rotation of the rotating unit. Accordingly, the strength to withstand the centrifugal force generated when rotating the unit at a very high speed has to be considered. Therefore, they can be used suitably as an impacting body of a rotating unit rotating at a relatively low speed or a rotating unit that requires a great cutting depth (the second rotating unit 120 in the example of Embodiment B-2). Furthermore, the shapes of the impacting body 190 (FIGS. 17A and 17B), the impacting body 200 (FIGS. 18A and 18B) and the impacting body 210 (FIGS. 19A and 19B) have intermediate characteristics between the above two groups and can be used for both the first rotating unit 110 and the second rotating unit 120 in the example of Embodiment B-2.

(Embodiment B-4)

Figure 22:
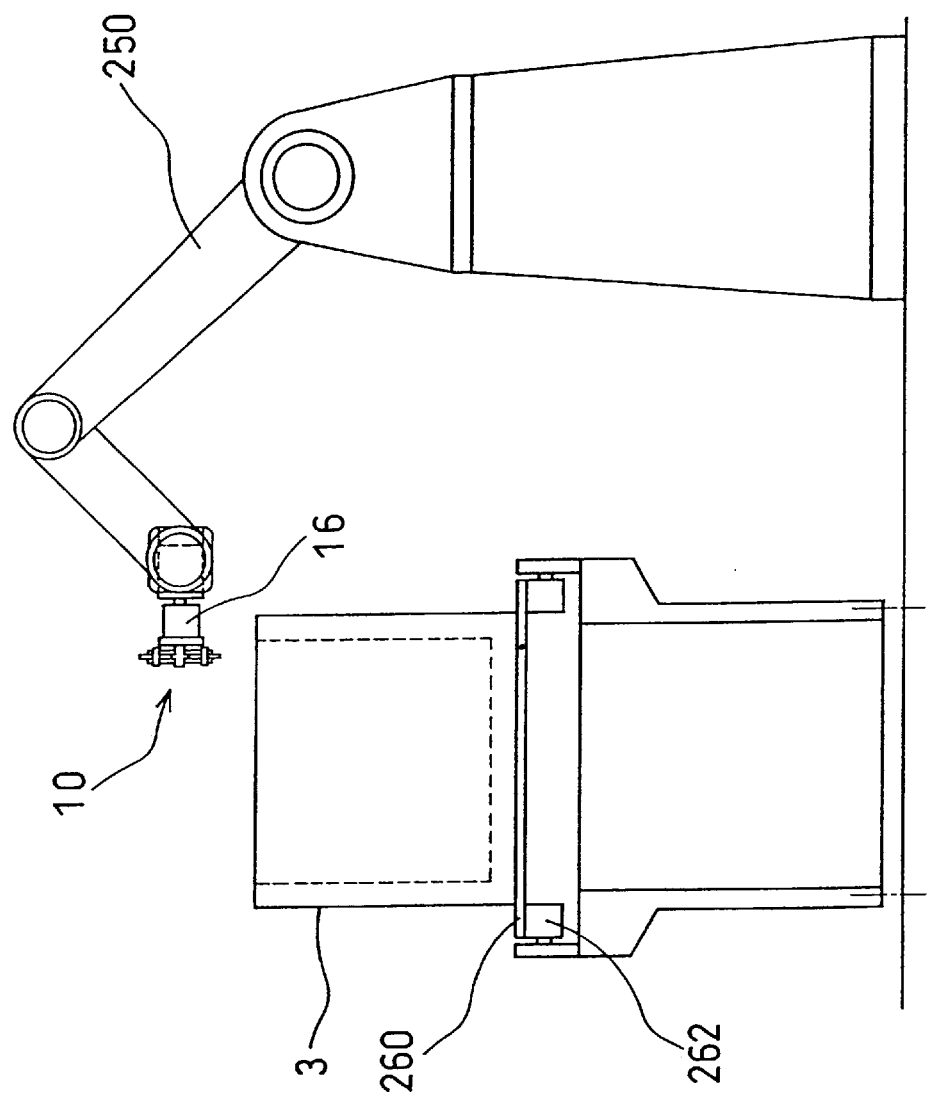
FIG. 22 is a side view showing a state of cutting a heat-insulating housing of a refrigerator by using the cutting device according to Embodiment B-1 of the present invention.
Figure 23:
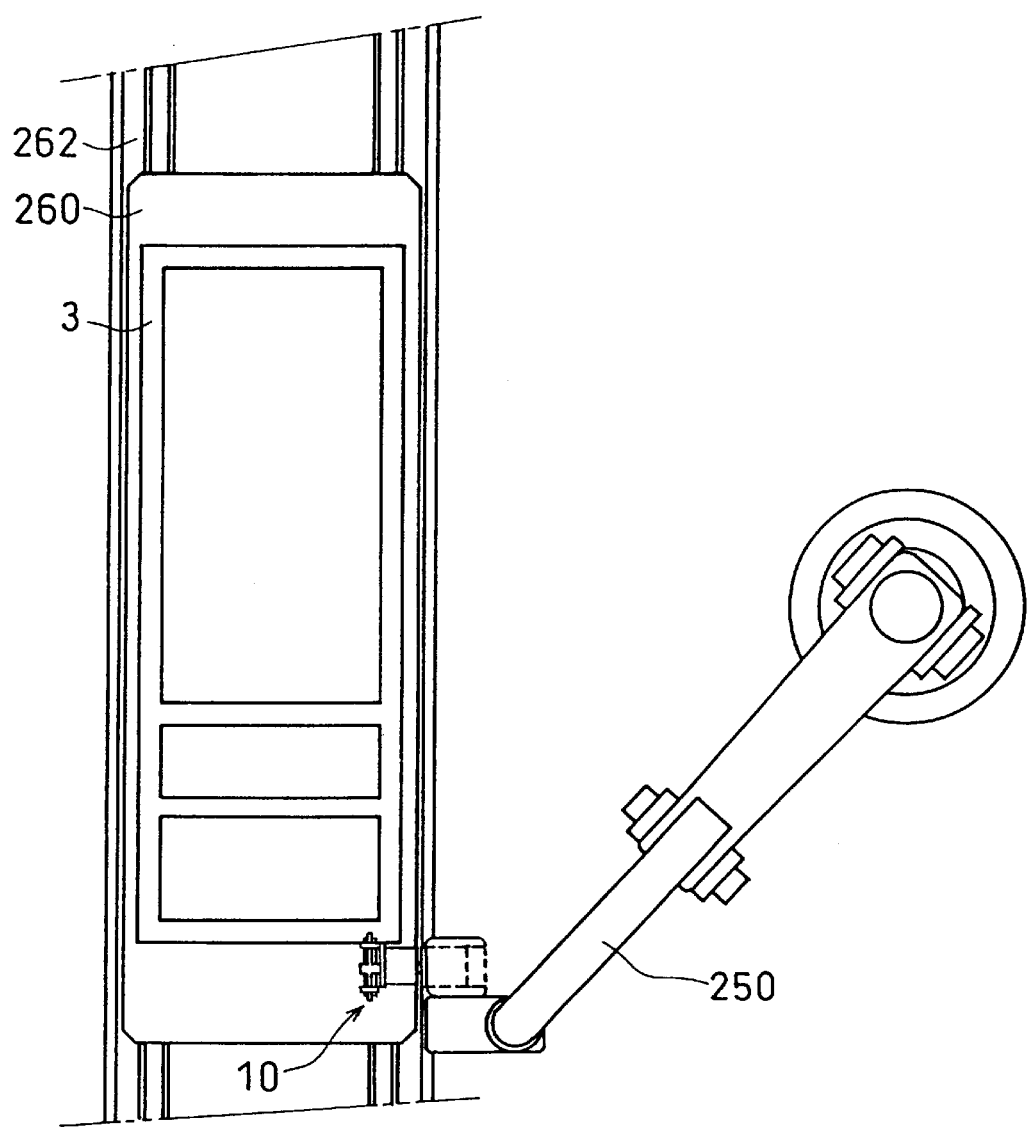
FIG. 23 is a plan view showing the state of cutting the heat-insulating housing of the refrigerator by using the cutting device according to Embodiment B-1 of the present invention.

FIGS. 22 and 23 both show the state of cutting a heat-insulating housing of a refrigerator by using cutting and processing equipment including the cutting device 10 illustrated in Embodiment B-1, with FIG. 22 being a side view and FIG. 23 being a plan view. The cutting and processing equipment of the present embodiment has a configuration in which the cutting device 10 of Embodiment B-1 is mounted to the tip of a robot arm.

In FIGS. 22 and 23, numeral 3 indicates a housing main body of a refrigerator, which is an object to be cut/processed (a workpiece) (as shown in FIG. 2, doors already are removed), numeral 10 indicates the cutting device described in Embodiment B-1, numeral 250 indicates a commercially available robot controlled with five axes, numeral 260 indicates a carrier pallet on which the housing main body 3 is loaded, and numeral 262 indicates a roller conveyor for carrying the carrier pallet 260. A driving motor 16 is attached to a jig at the tip of the arm of the robot 250, and its driving axis is connected with the main shaft 12 of the cutting device 10 (see FIGS. 6 and 7).

When the housing main body 3 loaded on the carrier pallet 260 arrives in front of the five-axes controlled robot 250, which is detected automatically, the cutting device 10 mounted to the arm of the robot 250 is rotated and driven. Thus, the housing main body 3 is cut and processed by the five-axes control function, for example, as described in FIGS. 3 to 5.

The above-mentioned equipment preferably is provided with a following control device (not shown in the figure). The control device detects at least one of an intrinsic oscillatory waveform and an intrinsic oscillation frequency that are caused by the impact of the impacting bodies of the cutting device 10 against the housing main body 3, the load on the driving motor 16 and an outer shape of the housing main body 3 and controls and changes at least one of the rotational speed of the rotating unit (the impact velocity of the impacting bodies) of the cutting device 10, a cutting depth and a relative speed (a feed speed) and a relative moving direction (for example, when the cutting is judged to be difficult, the cutting device 10 is reversed slightly) between the rotating unit and the housing main body 3. In this manner, even when the housing main body 3 is formed of a plurality of members with different physical properties, even when the material of the housing main body 3 is unknown, or even when the internal structure of the housing main body 3 that cannot be seen from the outside is unknown, optimum cutting conditions can be set automatically, thus achieving the automation of the cutting work.

In the above description, the cutting device 10 can be replaced with the cutting device 100 illustrated in Embodiment B-2. In this case, the above-mentioned control device can be provided for each rotating unit. In other words, the control device detects at least one of an intrinsic oscillatory waveform and an intrinsic oscillation frequency that are caused by the impact of the impacting bodies against the housing main body 3, the load on the driving motor for rotating each rotating unit and an outer shape of the workpiece and change at least one of the rotational speed, a cutting depth and a relative speed and a relative moving direction between the rotating unit and the housing main body 3 for each of the rotating units. In this manner, it is possible to set an appropriate cutting condition for each rotating unit.

Furthermore, instead of mounting the cutting device 100 of Embodiment B-2 including the first and second rotating units to one robot, it also is possible to provide a plurality of robots, each of which is provided with one rotating unit, and increase the cutting depth sequentially, thereby cutting into the housing main body 3 sequentially, for example.

It is needless to say that the conveyor system may be a belt conveyor or a chain conveyor.

C. Compressing Process

After being cut into a predetermined size and shape in the cutting and separating process described above, resultant pieces are sent to the compressing process. In the compressing process, the heat insulator is compressed so as to collect a gas (a foaming gas, for example, chlorofluorocarbons) contained therein.

Figure 24:
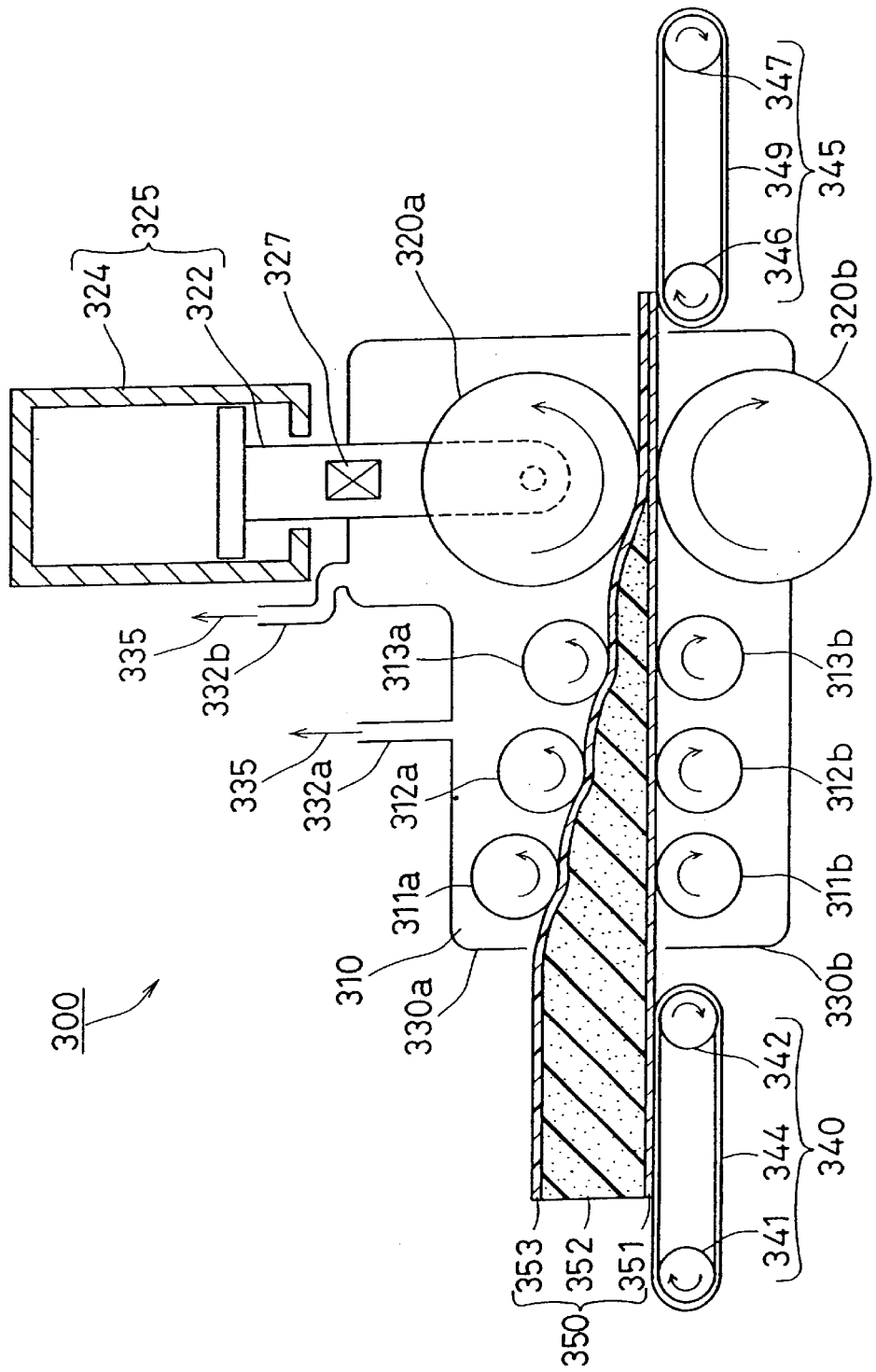
FIG. 24 is a front view showing a schematic configuration of a compressing device of the present invention.

FIG. 24 shows a schematic configuration of a compressing device 300 used in the compressing process.

The compressing device 300 has four pairs of compression rollers for compressing, from above and below, a piece to be compressed 350 obtained by cutting the heat-insulating housing. They are first preliminary compression rollers 311*a*, 311*b*, second preliminary compression rollers 312*a*, 312*b*, third preliminary compression rollers 313*a*, 313*b* and main compression rollers 320*a*, 320*b*. These four pairs of compression rollers are arranged such that the rollers in each pair oppose each other substantially in parallel and have a space therebetween, the space gradually decreasing in this order. Each space between the pair of rollers can be adjusted according to the piece to be compressed 350. The compression rollers are rotated and driven in directions indicated by arrows in FIG. 24. A rotational shaft of the upper main compression roller 320*a* is held by a piston 322, and a pressurizing mechanism 325 constituted by the piston 322 and a hydraulic cylinder 324 applies a predetermined compressive force between the main compression rollers 320*a*, 320*b*. A shaft of the piston 322 is provided with a pressure detection device (for example, a load cell) 327 for detecting a compressive force, with which the compressive force between the main compression rollers 320*a*, 320*b* is detected, and then a compressive force applied by the pressurizing mechanism 325 is adjusted.

A compressing chamber 310 containing the above-described four pairs of compression rollers is covered with an upper cover 330*a* and a lower cover 330*b*. The upper cover 330*a* is provided with suction ducts 332*a*, 332*b*, whose ends are connected to a suction pump (not shown in the figure).

The piece to be compressed 350 is sent into the compressing device 300 by a carrier device 340 and, after being compressed, sent out by a carrier device 345. The carrier device 340 is a belt conveyor constituted by a pair of rollers 341, 342 rotating in the arrow directions and an endless belt 344 running between them. Similarly, the carrier device 345 is a belt conveyor constituted by a pair of rollers 346, 347 rotating in the arrow directions and an endless belt 349 running between them. The upper surfaces of the carrier devices 340, 345 are designed to be at substantially the same height as the upper portions of the peripheral surfaces of the compression rollers 311*b*, 312*b*, 313*b* and 320*b*.

The following is a description of an operation of the compressing device configured as above.

After being cut in a suitable size and shape, the piece to be compressed 350 of the heat-insulating housing is sent to the compressing device 300 by the carrier device 340. The piece to be compressed 350 is a layered body formed of a steel plate layer 351, a heat insulator layer (a urethane foam layer) 352 and a resin plate layer 353. The heat insulator layer 352 of the piece 350 is compressed sequentially by the four pairs of compression rollers within the compressing device 300 and then almost completely squashed, especially by the last main compression rollers 320*a*, 320*b*, to such an extent that the steel plate layer 351 and the resin plate layer 353 nearly contact each other. By carrying out the compression using the rollers, a heavy load can be applied to a minute area. Furthermore, since a micro shearing force caused by the roller rotation can be generated in the heat insulator layer 352, all the closed-cells in the heat insulator layer 352 can be crushed easily and reliably, thereby squeezing a contained gas therefrom. In order to prevent the slip between the compression rollers and the piece 350, generate the above-mentioned shearing force reliably and improve the above-mentioned squeezing effect, roughness similar to that formed for knurling (for example, meshed grooves, longitudinal grooves, oblique grooves, dotted protrusions or recesses) may be formed on a peripheral surface of each of the compression rollers (in particular, the main compression rollers 320*a*, 320*b*). The compressive force of the main compression roller 320*a* during compression is monitored constantly by the pressure detection device 327. When the compressive force rises abnormally for such a reason that uncompressible foreign substances are mixed in the piece 350, the operation of adjusting the pressurizing mechanism 325 so as to reduce the compressive force or that of making all the compression rollers repeat rotating forward and backward is performed automatically.

During the compression, many closed-cells present inside the heat insulator layer 325 are crushed, so that a gas contained in those cells (for example, chlorofluorocarbons) is released. The gas is confined within the compressing chamber 310 constituted by the upper cover 330a and the lower cover 330b and not diffused outside. Generally, because its specific gravity is smaller than the air, this gas gathers upward and then is collected through the suction ducts 332a, 332b. The compressed piece 350 is carried out by the carrier device 345.

The piece 350 that has been carried out can be directly put into a blast furnace to make iron and then used again, for example. At this time, the laminated heat insulator layer 352 and resin plate layer 353 can be burnt in the blast furnace and used as a heat source. Since the foaming gas (chlorofluorocarbons) already is collected, there is no concern about the generation of a toxic gas such as a chlorine gas.

As described above, in accordance with the compressing device of the present invention, the foaming gas can be collected at a high concentration without being diffused in the air. Thus, it becomes easier to concentrate and separate the foaming gas, and simple equipment is sufficient for such operations, making it possible to achieve the miniaturization of equipment and the const reduction.

In order to lead out the foaming gas contained in the heat insulator, it is appropriate just to cut the heat-insulating housing of the refrigerator into a suitable-sized pieces with the steel plate and the resin plate being attached and to put them into the compressing device of the present invention. In other words, conventional processes of removing the steel plate and the resin plate from the heat insulator, crushing the heat insulator into fine pieces and separating the crushed material and the gaseous component all become unnecessary. Accordingly, the processes are simplified, so that the equipment becomes simpler and smaller and costs less.

Moreover, the compressed pieces can be put into a blast furnace directly and then used again.

Consequently, in accordance with the present invention, it is possible to achieve a disassembling of an unwanted refrigerator and a recycling system thereof easily at low cost.

Although FIG. 24 illustrates the configuration in which the compressing chamber 310 is covered with the upper and lower covers 330a, 330b, the present invention is not limited to the above configuration. For example, an openable door may be provided in each of an entrance through which the piece to be compressed 350 is put in and an exit through which the compressed piece is carried out, so that the compressing chamber 310 is completely sealed by the covers 330a, 330b and these doors during compression.

The arrangement of the compression rollers is not limited to the configuration of FIG. 24 as long as at least one pair of compression rollers that are arranged to oppose each other can compress the piece. For example, on the other side of the piece to be compressed with respect to the compression roller for contacting directly and compressing the piece to be compressed, a back-up roll may be provided for preventing a deflection of the compression roller. A so called crown roll, whose central diameter is larger than the diameter on both ends in its width direction also may be used for achieving a compressive force that is uniform along the width direction. Furthermore, the pair of compression rollers opposing each other may have a different outer shape.

In addition, the carrier devices 340 and 345 do not have to be the belt conveyor as shown in FIG. 24, but can be a roller conveyor, for example, or other known carrier mechanisms.

Furthermore, the cutting device and the compressing device can be connected by the carrier device, so that the pieces that have been cut and separated in the cutting device are carried to the compressing device automatically or semi-automatically. For example, both the devices can be connected by a belt conveyor or a roller conveyor, or the cut pieces can be transferred onto the carrier device 340 of the compressing device using a robot arm. This can improve a work efficiency of disassembling a refrigerator.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

INDUSTRIAL APPLICABILITY

In accordance with the present invention, it is possible to disassemble a refrigerator while collecting a foaming gas efficiently at low cost using a small device. Therefore, the present invention can be used suitably for a recycling system of a discarded refrigerator.

What is claimed is:

1. A compressing device comprising:
    at least a pair of compression rollers opposing each other for compressing/processing an object to be compressed;
    a gas diffusion preventing device for preventing a diffusion of a gas leaking from the object to be compressed during compressing; and
    a gas collecting device for collecting the gas.
2. The compressing device according to claim 1, further comprising a carrier device for carrying the object to be compressed.
3. The compressing device according to claim 2, wherein the carrier device is a belt conveyor.
4. The compressing device according to claim 1, wherein the object to be compressed is a piece obtained by cutting a heat-insulating housing of a refrigerator.

* * * * *